(12) United States Patent
Ilievski et al.

(10) Patent No.: US 9,464,642 B2
(45) Date of Patent: Oct. 11, 2016

(54) SOFT ROBOTIC ACTUATORS

(75) Inventors: Filip Ilievski, Boston, MA (US); Xin Chen, Cambridge, MA (US); Aaron D. Mazzeo, Cambridge, MA (US); George M. Whitesides, Cambridge, MA (US); Robert F. Shepherd, Brooktondale, NY (US); Ramses V. Martinez, Somerville, MA (US); Won Jae Choi, Cambridge, MA (US); Sen W. Kwok, Watertown, MA (US); Stephen Morin, Arlington, MA (US); Adam Stokes, Watertown, MA (US); Zhihong Nie, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 598 days.

(21) Appl. No.: 13/885,967

(22) PCT Filed: Nov. 21, 2011

(86) PCT No.: PCT/US2011/061720
§ 371 (c)(1),
(2), (4) Date: Dec. 31, 2013

(87) PCT Pub. No.: WO2012/148472
PCT Pub. Date: Nov. 1, 2012

(65) Prior Publication Data
US 2014/0109560 A1    Apr. 24, 2014

Related U.S. Application Data

(60) Provisional application No. 61/415,508, filed on Nov. 21, 2011, provisional application No. 61/544,849, filed on Oct. 7, 2011.

(51) Int. Cl.
*F15B 7/06* (2006.01)
*B25J 9/10* (2006.01)
(Continued)

(52) U.S. Cl.
CPC ............. *F15B 7/06* (2013.01); *B25J 9/1075* (2013.01); *B25J 9/142* (2013.01); *B25J 11/00* (2013.01); *F15B 15/10* (2013.01)

(58) Field of Classification Search
CPC ...... F15B 15/103; B25J 9/1075; B25J 9/142; B25J 11/00
USPC .............................................................. 92/92
See application file for complete search history.

(56) References Cited

U.S. PATENT DOCUMENTS 3,284,964 A    11/1966  Saito
3,343,864 A *  9/1967  Baer ................... B25J 15/0009
                                                    92/92

(Continued)

FOREIGN PATENT DOCUMENTS

EP    1190819 A1    3/2002
EP    1319845 A2    6/2003
(Continued)

OTHER PUBLICATIONS

Bar-Cohen, et al., "Low-mass Muscle Actuators using electroactive polymers (EAP)", Proceedings of SPIE's 5th Annual International Symposium on Smart Structures and Materials, Mar. 1-5, 1998, San Diego, CA. Paper No. 3324-32 (6 pages).
(Continued)

*Primary Examiner* — Thomas E Lazo
(74) *Attorney, Agent, or Firm* — Wilmer Cutler Pickering Hale and Dorr LLP

(57) ABSTRACT

A soft robotic device includes a flexible body having a width, a length and a thickness, wherein the thickness is at least 1 mm, the flexible body having at least one channel disposed within the flexible body, the channel defined by upper, lower and side walls, wherein at least one wall is strain limiting; and a pressurizing inlet in fluid communication with the at least one channel, the at least one channel positioned and arranged such that the wall opposite the strain limiting wall preferentially expands when the soft robotic device is pressurized through the inlet.

34 Claims, 35 Drawing Sheets

(51) Int. Cl.
B25J 9/14 (2006.01)
F15B 15/10 (2006.01)
B25J 11/00 (2006.01)

(56) References Cited

U.S. PATENT DOCUMENTS

| | | | |
|---|---|---|---|
| 3,601,442 A * | 8/1971 | Orndorff | B25J 15/0023 92/92 |
| 3,713,685 A | 1/1973 | Ewing | |
| 3,981,528 A | 9/1976 | Andorf et al. | |
| 4,751,869 A | 6/1988 | Paynter | |
| 4,784,042 A | 11/1988 | Paynter | |
| 4,815,782 A | 3/1989 | Craig et al. | |
| 4,928,926 A | 5/1990 | Bloemendal et al. | |
| 5,018,506 A | 5/1991 | Danna et al. | |
| 5,021,064 A * | 6/1991 | Caines | A61F 2/68 623/26 |
| 5,156,081 A | 10/1992 | Suzumori | |
| 5,317,952 A | 6/1994 | Immega | |
| 5,385,080 A | 1/1995 | Suzumori | |
| 5,568,957 A | 10/1996 | Haugs | |
| 5,619,993 A | 4/1997 | Lee | |
| 5,833,291 A | 11/1998 | Haugs | |
| 6,178,872 B1 | 1/2001 | Schulz | |
| 6,718,766 B2 * | 4/2004 | Seto | B25J 9/142 60/476 |
| 6,772,673 B2 * | 8/2004 | Seto | B25J 9/142 92/92 |
| 7,086,322 B2 | 8/2006 | Schulz | |
| 7,258,379 B2 * | 8/2007 | Ono | B25J 9/142 294/119.3 |
| 7,327,067 B2 | 2/2008 | Ishibashi et al. | |
| 7,331,273 B2 * | 2/2008 | Kerekes | B60N 2/4415 92/92 |
| 7,617,762 B1 * | 11/2009 | Ragner | F16J 3/06 92/37 |
| 7,654,595 B2 | 2/2010 | Yokoyama et al. | |
| 2002/0108491 A1 * | 8/2002 | Stahn | F01B 19/04 92/92 |
| 2004/0050247 A1 | 3/2004 | Topping | |
| 2004/0267331 A1 * | 12/2004 | Koeneman | A61H 1/02 607/49 |
| 2005/0282462 A1 | 12/2005 | Panec et al. | |

FOREIGN PATENT DOCUMENTS

| | | |
|---|---|---|
| JP | 8-323676 | 12/1996 |
| JP | 2006204612 A | 8/2006 |
| WO | WO-2006036067 A2 | 4/2006 |
| WO | WO-2006080088 A1 | 8/2006 |

OTHER PUBLICATIONS

Brown, et al., "Universal robotic gripper based on the jamming of granular material" PNAS vol. 107 (44):18809-18814 and 10.1073/pnas.1003250107, Nov. 2010 (7pages).
Brown, et al., "Universal Robotic Gripper Based on the Jamming of Granular Material: Supporting Information", Supporting information of Brown, et al., 10.1073/pnas.1003250107, PNAS, www.pnas.org/content/10744/18809/suppl/DCSupplemental, Published online Oct. 25, 2010, Accessed Aug. 21, 2014, 5 pages.
Chou, et al., "Measurement and Modeling of McKibben Pneumatic Artificial Muscles", IEEE Transactions on Robotics and Automation, 12(1):90-102, Feb. 1996, 13 pages.
Correll, et al., "Soft Autonomous Materials-Using Active Elasticity and Embedded Distributed Computation", 12th International Symposium on Experimental Robotics, Delhi, India, Dec. 18-21, 2010 (14 pages).
Daerden et al., "Pneumatic Artificial Muscles: actuators for robotics and automation", Vrije Universiteit Brussel, Department of Mechanical Engineering, European Journal of Mechanical and Environmental Engineering, No Month Given, 2000 (13 pages).
Fujiwara, et al., "Linear Expansion and Contraction of Paired Pneumatic Baloon Bending Actuators Toward Telescopic Motion", 22th IEEE Int. Conf. on Micro Electro Mechanical Systems ( MEMS 2009 ), Sorrento, Italy No Month Given, (1 page).
Galloway, Soft Actuator Prior Art Survey, Wyss Institute @ Harvard University, Dec. 12, 2012, Version 1, (34 pages).
Hamlen, et al., "Electrolytically Activated Contractile Polymer", Nature 206(4989): 1149-1150, Jun. 12, 1965 (2 pages).
Ilievski, et al., "Soft Robotics for Chemists", Angew. Chem. Int. Ed., 50:1890-1895, No Month Given, 2011, 6 pages.
International Search Report and Written Opinion for International Patent Application No. PCT/US2011/061720 mailed May 8, 2013. 9 pages.
Kim, et al., "Micro artificial muscle fiber using NiTi spring for soft robotics", The 2009 IEEE/RSJ International Conference on Intelligent Robots and Systems, Oct. 11-15, 2009 St. Louis, USA, 2228-2234 (7 pages).
Kim, et al., "Manufacturing of Inchworm Robot Using Shape Memory Alloy (SMA) Embedded Composite Structure", International Journal of Precision Engineering and Manufacturing, 12(3):565-568, Jun. 2011, 4 pages.
Konishi, et al., "Merging micro and macro robotics toward micro manipulation for biomedical operation", Proceedings of the 36th International Symposium on Robotics, 2005 (6 pages).
Laschi, et al., "Design of a biomimetic robotic octopus arm", Bioinspiration & Biomimetics, 4(1); Mar. 2009 (9 pages).
Lee, et al., "First Jump of Microgel: Actuation Speed Enhancement by Elastic Instability", Soft Matter, 6:4342-4345, No Month Given, 2010, accessed Aug. 21, 2014, 4 pages.
Marchese, et al., "Soft Robot Actuators using Energy-Efficient Valves Controlled by Electropermanent Magnets", International Conference on Intelligent Robots and Systems p. 756-761. IEEE, (No Month Given 2011) (7 pages).
Micro/Nano Mechatronics Lab., Konishi Lab, "Fluid-Resistive Bending Sensor Having Perfect Compatibility with Flexible Pneumatic Balloon Actuator", Group Robotics Ritsumeikan University, No Date Given (1 page).
Martinez, et al., "Elastomeric Origami: Programmable Paper-Elastomer Composites as Pneumatic Actuators", Advanced Functional Materials, 22:1376-1384, No Month Given, 2012, 9 pages.
Martinez, et al., "Robotic Tentacles with Three-Dimensional Mobility Based on Flexible Elastomers", Advanced Materials, 25:205-212, No Month Given 2013, 8 pages.
Morin, et al., "Camouflage for Soft Machines", Department of Chemistry and Chemical Biology, Harvard University, no date given (17 pages).
Morin, et al., "Camouflage and Display for Soft Machines", Science, 337:828-832, Aug. 17, 2012, 6 pages.
Nakajima, et al., "Timing and Behavioral Efficiency in Controlling a Soft Body: A Case Study in Octopus Reaching", The 2nd International Conference on Morphological Computation, No month given. 2011, pp. 133-135, (3 pages).
Onal, et al, "Soft mobile robots with on-board chemical pressure generation", 15th International Symposium on Robotics Research, Flagstaff, AZ—Aug. 28-Sep. 1, 2011 (16 pages).
Osada, et al., "Soft and Wet Materials: Polymer Gels", Advanced Materials 10(11):827-837, 1998 (11 pages).
Otake, et al., "Motion design of a starfish-shaped gel robot made of electro-active polymer gel", Robotics and Autonomous Systems 40(2-3):185-191, 2002 (7 pages).
Shepherd, et al., "Multigait Soft Robot", PNAS, 108(51):20400-20403, Dec. 20, 2011, 4 pages.
Shepherd, et al., "Using Explosions to Power a Soft Robot", Angew. Chem. Int. Ed., 52:2892-2896, No Month Given 2013, 5 pages.
Shi, et al., "A Novel Soft Biomimetic Microrobot with Two Motion Attitudes", Sensors, 12:16732-16758, Dec. 6, 2012, 27 pages.
Steltz, et al, "JSEL: Jamming Skin Enabled Locomotion", The 2009 IEEE/RSJ International Conference on Intelligent Robots and Systems Oct. 11-15, 2009 St. Louis, USA (6 pages).
Suzumori, "Elastic materials producing compliant robots", Robotics and Autonomous Systems 18:135-140, No Month Given 1996 (6 pages).

(56) References Cited

OTHER PUBLICATIONS

Symposium L—NEMS/MEMS Technology and Devices, International Conference on Materials for Advanced Technologies 2009 and International Union of Materials Research Societies—International Conference in Asia Jun. 28-Jul. 3, 2009 (68 pages).

Trivedi, et al., "Geometrically exact dynamic models for soft robotic manipulators", Proceedings of the 2007 IEEE/RSJ International Conference on Intelligent Robots and Systems, San Diego, CA, USA, Oct. 29-Nov. 2, 2007 (6 pages).

Wakimoto, et al., "Miniature Pneumatic Curling Rubber Actuator Generating Bidirectional Motion with One Air-Supply Tube", Advanced Robotics, 25:1311-1330, No Month Given 2011, accessed Aug. 21, 2014, 20 pages.

\* cited by examiner

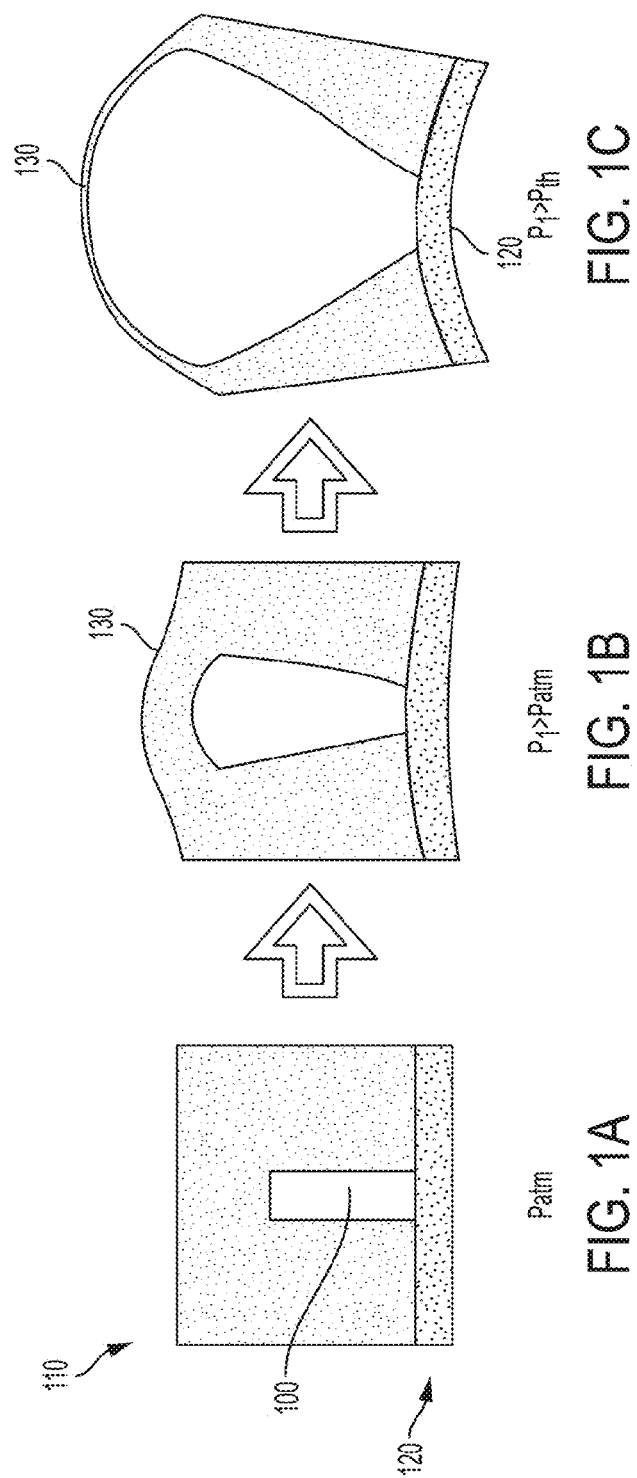

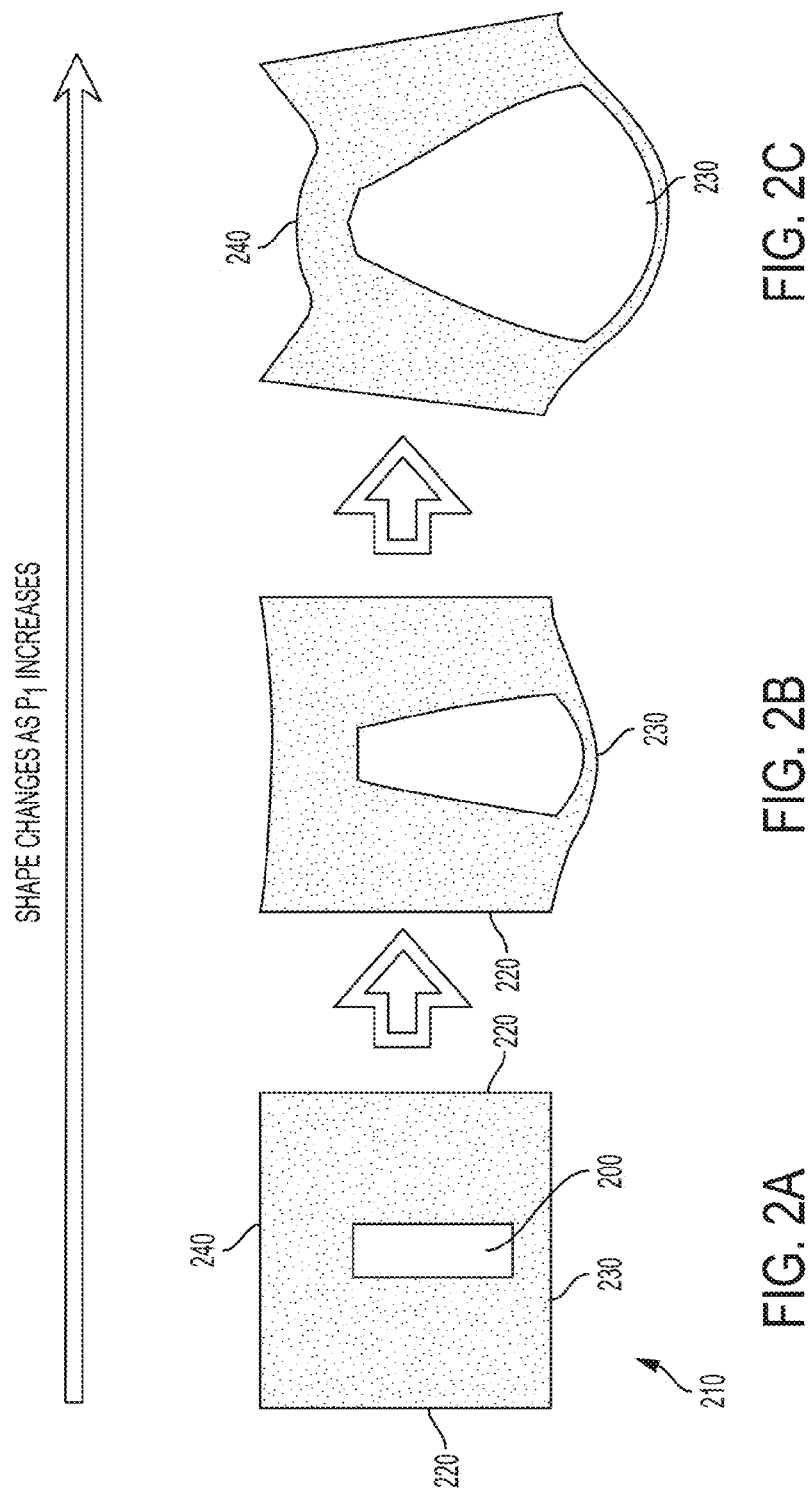

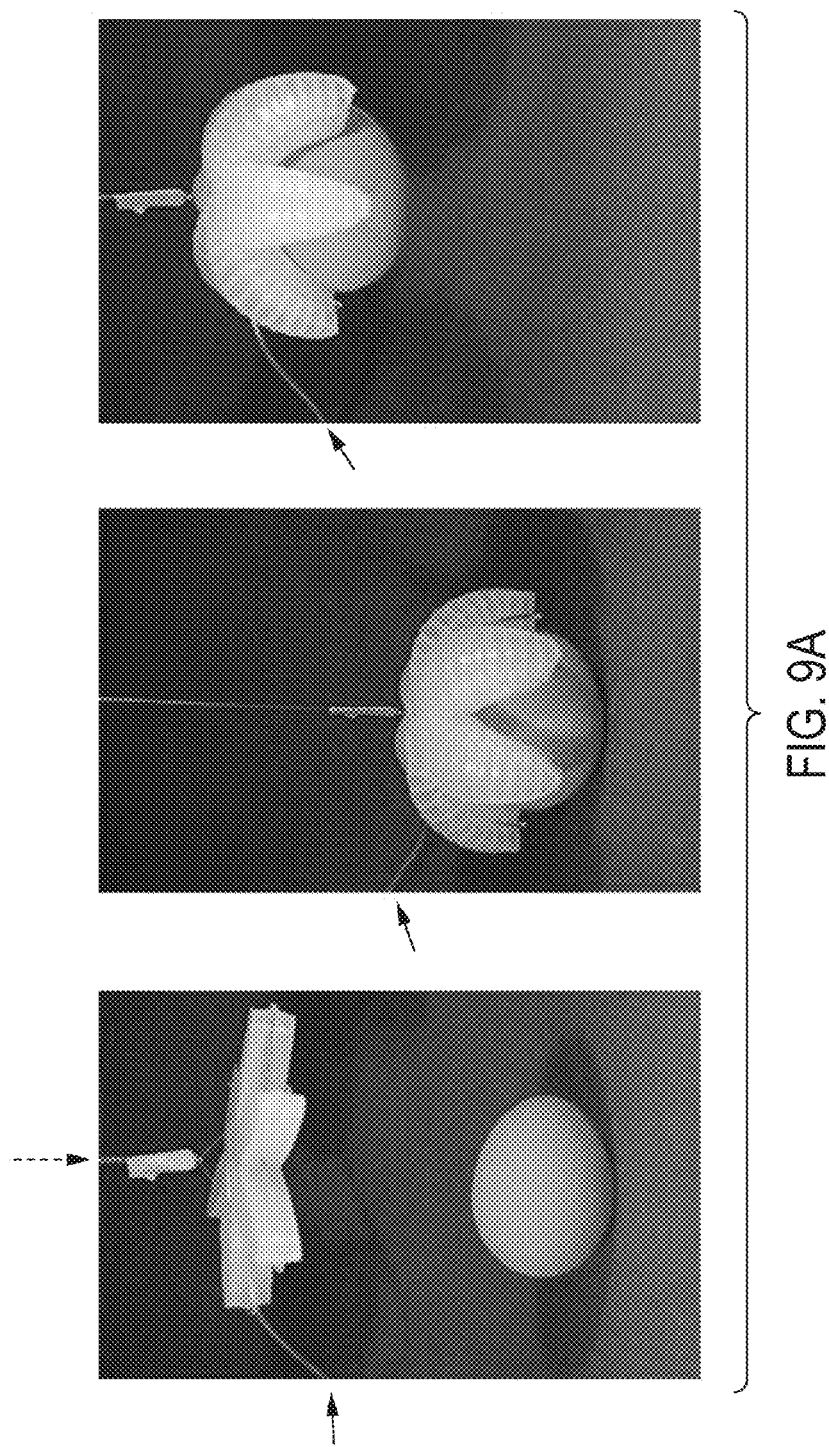

INTEGRATED OCTOPUS PATTERN

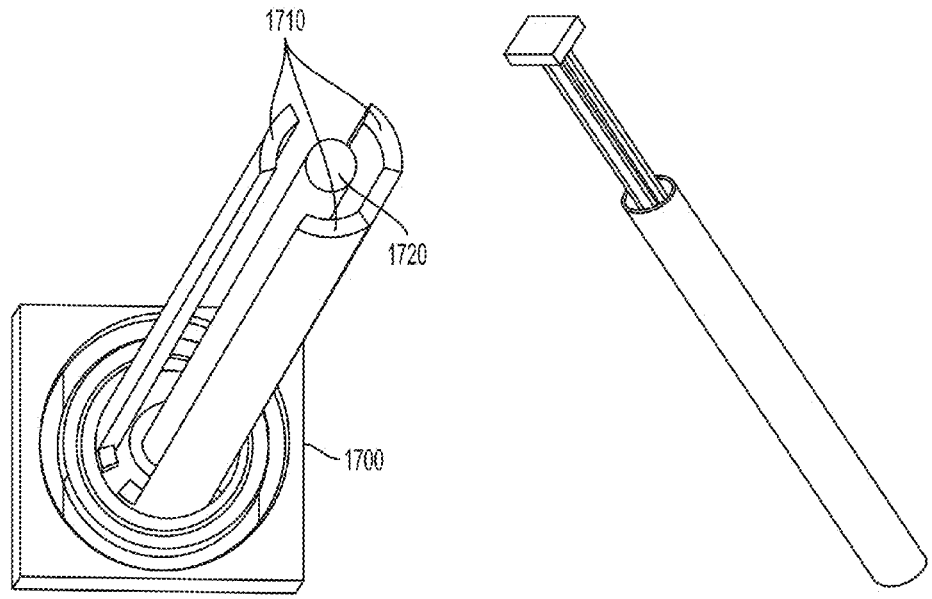
FIG. 20A
FIG. 20B
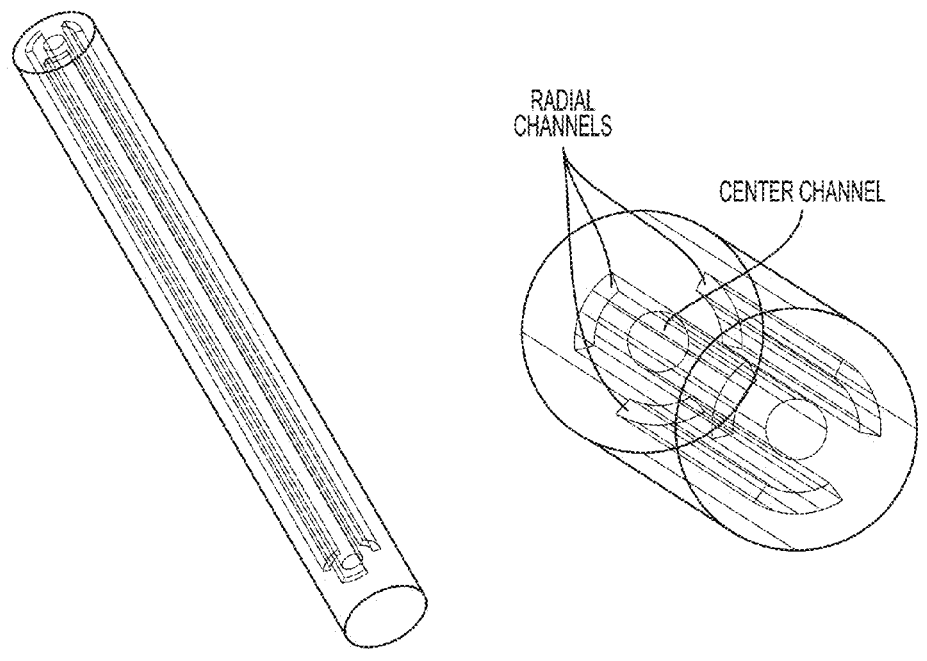
FIG. 20C

☐ ECOFLEX

☐ PDMS(0.25 mm THICK)

SOFT ROBOTIC ACTUATORS

CROSS-REFERENCE TO RELATED APPLICATIONS

This application is a national stage application, under 35 U.S.C. §371, of a PCT Application No. PCT/US2011/061720 filed Nov. 21, 2011, which claims benefit of U.S. Provisional Patent Application No. 61/415,508, entitled "Soft Robotic Actuators," filed Nov. 19, 2010; and of U.S. Provisional Patent Application No. 61/544,849, entitled "Soft Robotic Actuators," filed Oct. 7, 2011, the entire contents of all patent applications are herein incorporated by reference.

STATEMENT REGARDING FEDERALLY SPONSORED RESEARCH OR DEVELOPMENT

The present invention was made with United States government support under Grant Nos. W911NF-08-1-0143, W911NF-08-C-0060, and W911NF-11-1-0094 awarded by the DARPA. The United States government has certain rights in this invention.

INCORPORATION BY REFERENCE

All patents, patent applications and publications cited herein are hereby incorporated by reference in their entirety in order to more fully describe the state of the art as known to those skilled therein as of the date of the invention described herein.

BACKGROUND

This technology relates generally to flexible actuators. In particular, this invention relates to soft robotic manipulators.

An example of a "robot" is an automatically controlled, programmable, multipurpose manipulator. A robot can perform its function at a fixed location, or in motion. Robotics is a field of enormous (and growing) importance, in fields from assembly to surgery. Most robotic systems are "hard", that is, composed of metallic structures with joints based on conventional bearings. These structures are often modeled after animal limbs (although structures not found in nature—for example, wheels and treads—are also common in mobile robots).

In an effort to build robots that can carry out sophisticated tasks in unstructured environments, researchers continue to emulate living creatures and their materials, morphology and movements. Over the last several years, soft robotic manipulators have generated significant interest due to their wide range of potential applications that are challenging for "hard" robots. For example, soft robots can handle delicate objects such as eggs because the surface of soft robots can conform to the shape of the handled objects. Soft robots can also fit into places that are challenging for hard robots. For instance, a soft robot can fit under a door jam by deflating itself. In addition, soft robots can move in an environment that are challenging for hard robots. For instance, soft robots can maneuver on non-stiff surfaces, such as mud, clay, jello, or in fluids such as water.

One way to build a soft robotic manipulator is by integrating rigid robotic skeletons with soft skins or compartments. However, these structures can only move in limited ways. In addition, rigid skeletons may not be suited for many applications, such as manipulating delicate objects or objects with significant part-to-part variance.

Pneumatic artificial muscles, such as McKibben actuators, are contractile or extensional devices operated by pressurized air. McKibben-type actuators have a simple structure consisting of an internal bladder wrapped in a braided mesh shell. The braided mesh shell includes flexible yet non-extensible threads oriented at a bias around the bladder. When the internal bladder is pressurized, the pressurized air pushes against the inner bladder surface and external shell, causing the bladder to expand. Like the Chinese finger puzzle, the braided mesh shell shortens in a scissor-like action due to the non-extensibility of the threads. As the braided mesh shell shortens, the actuator shortens accordingly, thereby exerting a force in the direction of contraction. These actuators can be fast and can have length-load dependence similar to that of muscles, but possess only one mode of actuation—contraction and extension.

Soft robots, or soft robotic actuators, can be most easily identified by the materials used in their manufacture and their methods of actuation. The field of soft robotic actuation began with work by Kuhn et al in 1950. Kuhn et al focused on the reversible change of a polymeric material, namely the coiling and uncoiling. The reversible change of a polymeric material depends on the acidity of the surrounding medium. Kuhn et al leveraged this property to successfully move a weight. This demonstrated the possibility of using soft materials in robotic actuation. Hamlen et al extended this idea in 1965 and showed that polymeric materials can be contracted electrolytically.

Kuhn et al and Hamlen et al set the scene for using the polymeric gels for soft robotics. In particular, Otake et al demonstrated the use of electro-active polymers in the manufacture of starfish-shaped robotic actuators. Also, in 1996, Suzumori et al demonstrated pneumatically-driven soft actuators. These actuators were configured to respond to pressurization of sealed chambers fabricated from extensible polymers. This type of actuation has been used on the millimeter scale to fabricate grippers, tentacles, and other related devices including pneumatic balloon actuators.

There is a need for larger portions of robots to be composed of soft materials. There is also a need for actuators that provide more and greater modes of movement.

SUMMARY

Soft robotic actuators configured to perform new fundamental motions—such as bending, twisting, and straightening—are described. These and other aspects and embodiments of the disclosure are illustrated and described below.

Certain embodiments describe fabrication and operation of pressurizable networks of channels or chambers (PneuNets) embedded in elastomeric or extensible bodies. The pressurizable network actuators can be programmed to change shape and mechanical properties using an external stimulus, including pneumatic or hydraulic pressure. The soft robot structures utilize designs of embedded pneumatic or hydraulic networks of channels in elastomers that inflate like balloons for actuation or in folded extensible fabrics that can open up when pressurized. A pluralities of chambers embedded within an elastomer can be used as a series of repeating components. Stacking and connecting these repeated components provide structures capable of complex motion. In this type of design, complex motion requires only a single pressure source (although more than one source can be used, if desired). The appropriate distribution, configuration, and size of the pressurizable networks, in combination with a sequence of actuation of specific network elements, determine the resulting movement.

In one aspect, a soft body robotic device includes a flexible molded body having a plurality of interconnected chambers disposed within the molded body. A portion of the molded body is comprised of an elastically extensible material and a portion of the molded body is strain limiting relative to the elastically extensible material. The thickness of the molded body is at least 1 mm. The soft body robotic device further includes a pressurizing inlet that is configured to receive fluid for the plurality of interconnected chambers. The molded body in the soft body robotic device is configured to preferentially expand when the plurality of interconnected chambers are pressurized by the fluid, causing a bending motion around the strain limiting portion of the molded body.

In one aspect, a soft body robotic device includes a flexible molded body comprising a plurality of interconnected pleated chambers. The flexible molded body includes a flexible material and is affixed to a strain limiting member in such a manner that the strain limiting member forms a wall of the plurality of interconnected pleated chambers. The thickness of the molded body is at least 1 mm. The soft body robotic device further includes a pressurizing inlet that is configured to receive fluid for the plurality of interconnected pleated chamber. The plurality of interconnected pleated chambers are configured to preferentially unfold when the flexible molded body is pressurized through the pressurizing inlet, causing bending motion around the strain limiting member.

In one aspect, a soft body robotic device is capable of extension. This soft robotic device includes a flexible molded body having a plurality of interconnected chambers disposed within the molded body. The soft robotic device also includes a sealing member in a facing relationship with the flexible molded body, in which the flexible molded body and the sealing member together define a plurality of channels. Each channel is defined by upper, lower and side walls. The sealing member is in a state of compression in its resting state. The soft robotic device additionally includes a pressurizing inlet in fluid communication with the plurality of channels. The plurality of channels are positioned and arranged such that the soft body robotic device expands to relieve the strain in the sealing member when the soft body robotic device is pressurized through the inlet.

In any of the embodiments described herein, the soft robotic device can be free of a rigid weight-bearing skeleton.

In any of the embodiments described herein, the strain limiting portion or member can have a wall thickness greater than other portions of the flexible molded body.

In any of the embodiments described herein, the strain limiting portion or member can be formed using a material with higher elastic modulus compared to that of a material forming other portions of the flexible molded body.

In any of the embodiments described herein, the flexible molded body can comprise a reinforcing material to increase toughness and resistance to damage.

In any of the embodiments described herein, the reinforcing material can comprise high tensile modulus fibers.

In any of the embodiments described herein, the outer surface of the flexible molded body can be substantially flat and the plurality of interconnected chambers can be embedded within an interior of the molded body.

In any of the embodiments described herein, the sealing member comprises a strain limiting member and the molded body comprises a plurality of interconnected chambers in facing and sealing relationship with the strain limiting member, and the strain limiting member forms a wall of a chamber.

In any of the embodiments described herein, the molded body is comprised of a single material and the plurality of interconnected chambers comprise at least one wall that is thinner than the strain limiting portion or the strain limiting member.

In any of the embodiments described herein, the soft robotic device further comprises a second plurality of interconnected chambers in facing and sealing relationship with the strain limiting member on a face opposite to the first plurality of interconnected chambers.

In any of the embodiments described herein, the flexible molded body and the plurality of interconnected chambers each have a longitudinal axis. The longitudinal axes of the plurality of interconnected chambers are positioned and arranged at an angle with respect to the longitudinal axis of the flexible molded body, and the angle can be between zero and 90 degrees.

In any of the embodiments described herein, the longitudinal axes of the plurality of interconnected chambers are positioned and arranged at an angle with respect to the longitudinal axis of the flexible molded body and the angle is between about 45 degrees and about 75 degrees.

In any of the embodiments described herein, a perpendicular cross-section of one of the interconnected chambers is a rectangle.

In any of the embodiments described herein, a perpendicular cross-section of one of the interconnected chambers is a shape selected from the group consisting of square, circle, and polygon.

In any of the embodiments described herein, the sealing member further comprises a reinforcing fiber or fabric.

In any of the embodiments described herein, a thickness of the flexible molded body is in the range of about 5 mm and 5 cm.

In any of the embodiments described herein, the flexible molded body further includes a functional feature disposed on a surface of the flexible molded body.

In any of the embodiments described herein, the functional feature is disposed on the strain limiting portion or the strain limiting member or the sealing member.

In any of the embodiments described herein, the functional feature is disposed on the molded body.

In any of the embodiments described herein, the functional feature is one or more features selected from the group consisting of a traction layer, a bidirectional fabric layer, a camouflage layer, a self-healing layer, suction cups and magnets.

In any of the embodiments described herein, the self healing layer comprises a self-sealing layer disposed on a portion of the flexible molded body. The self-sealing layer can include a material of lower elastic modulus compared to that of a material forming the flexible molded body.

In any of the embodiments described herein, the camouflaging layer includes a plurality of fluid chambers and a plurality of fluid inlets. Each of the plurality of fluid chambers can be in fluid communication with one of the plurality of fluid inlets.

In any of the embodiments described herein, the soft robot device includes a pressure source configured to be in fluid communication with the pressurizing inlet, wherein the pressure source is configured to provide the fluid.

In any of the embodiments described herein, the pressure source includes a microcompressor or a water electrolyzer.

In any of the embodiments described herein, the soft robotic device includes a magnet.

In any of the embodiments described herein, the magnet has a hollow region, and the pressurizing inlet is disposed in the hollow region.

In any of the embodiments described herein, the plurality of soft robotic devices are joined by an attraction between the magnets of the plurality of soft robotic devices.

In any of the embodiments described herein, the soft robot includes a pressure source configured to be in fluid communication with the pressurizing inlet of one of the plurality of soft robotic devices to provide the fluid to the plurality of soft robotic devices.

In one or more embodiments, a multi-component soft robot can include a plurality of soft robotic devices as disclosed in certain embodiments. The multi-component soft robot can also include a connector having a plurality of fluidic inputs and a pressurizing inlet. The pressurizing inlet is configured to receive fluid, and each of the plurality of soft robotic devices is reversibly attached to one of the plurality of fluidic inputs by a magnetic attractive force.

In one or more embodiments, a gripping device can include a plurality of actuatable arms. Each of the plurality of actuatable arms can include a soft robotic device as disclosed in certain embodiments. The plurality of actuatable arms can be configured to bend from a first resting position to a second actuated position upon pressurization.

In any of the embodiments described herein, at least one of the plurality of actuatable arms in the gripping device includes a surface layer that improves traction.

In any of the embodiments described herein, each of the plurality of actuatable arms in the gripping device includes a magnet, and wherein the plurality of actuatable arms are pneumatically coupled using the magnet.

In any of the embodiments described herein, the gripping device is configured to lift loads in a range of greater than 80 g and/or of a size that is greater than 1 cm.

In one or more embodiments, a soft robot capable of locomotion includes a plurality of arms. Each of the plurality of arms includes a soft robotic device as disclosed in certain embodiments. Each of the plurality of arms can also have a gripping surface over which at least a portion of the plurality of arms engage with a terrain. The soft robot capable of locomotion can also have a plurality of pressurizing inlets configured to receive pressurized fluid.

In any of the embodiments described herein, the soft robot further includes a pressure source having a fluid outlet. The fluid outlet can be configured to be in fluid communication with a pressurizing inlet of one of the plurality of arms.

In any of the embodiments described herein, the soft robot further includes a pressure source having a plurality of fluid outlets, wherein each of the plurality of fluid outlets is configured to be in fluid communication with a pressurizing inlet of one of the plurality of arms.

In any of the embodiments described herein, the pressure source includes a microcompressor and a water electrolyzer.

In one or more embodiments, a soft machine having multiple functionalities includes a soft robot capable of locomotion have a first pressurizing inlet as disclosed in certain embodiments. The soft robot can be configured to provide locomotion to the soft machine. The soft machine can also include a gripping device having a second pressurizing inlet, as disclosed in certain embodiments. The soft machine can further include a physical connector disposed between the soft robot capable of locomotion and the gripping device.

In any of the embodiments described herein, the soft machine can include a pressure source having a first fluid outlet and a second fluid outlet. The first fluid outlet is configured to be in fluid communication with the first pressurizing inlet, and the second fluid outlet is configured to be in fluid communication with the second pressurizing inlet.

In any of the embodiments described herein, the physical connector includes a flexible tether.

In one or more embodiments, a method of actuation includes providing a soft robotic device or a gripping device or a soft robot or a pressurizable network or a soft machine as disclosed in certain embodiments. The method can also include providing sufficient pressure to the soft robotic device or the gripping device or the soft robot or the pressurizable network or the soft machine to cause a less stiff wall to expand preferentially, thereby causing the soft robotic device or the gripping device or the soft robot or the pressurizable network or the soft machine to bend around a strain limiting member of the soft robotic device or the gripping device or the soft robot or the pressurizable network or the soft machine.

In any of the embodiments described herein, the method of actuation can also include providing the sufficient pressure includes supplying the sufficient pressure using a pneumatic pressure source.

In any of the embodiments described herein, providing the sufficient pressure includes supplying the sufficient pressure using a hydraulic pressure source.

In any of the embodiments described herein, supplying the sufficient pressure includes supplying the sufficient pressure in a sequence selected to provide motion on a terrain.

In any of the embodiments described herein, supplying sufficient pressure includes supplying the sufficient pressure in a sequence selected to provide motion in water.

In one or more embodiments, a method of gripping includes providing a gripping device as disclosed in certain embodiments. The method of gripping can further include initiating a series pressurizations and depressurizations that bring the gripping device in gripping contact with a target object.

In one or more embodiments, a method of camouflaging a soft robotic device can include providing a soft robot as disclosed in certain embodiments, and providing fluid of a first characteristic to a first of the plurality of fluid inlets.

In any of the embodiments described herein, the fluid of the first characteristic includes a pigment.

In any of the embodiments described herein, the fluid of the first characteristic includes a fluorescence material.

In any of the embodiments described herein, the fluid of the first characteristic includes a phosphorescence material.

In any of the embodiments described herein, the method of camouflaging a soft robotic device can further include providing fluid of a second characteristic to a second of the plurality of fluid inlets. The second characteristic can be different from the first characteristic.

In one or more embodiments, a method of providing locomotion to a soft robot can include providing a soft robot as disclosed in certain embodiments, providing pressurized fluid to a first pressurizing inlet of the soft robot, and providing pressurized fluid to a second pressurizing inlet of the soft robot, thereby separately actuating a first arm associated with the first pressurizing inlet and a second arm associated with the second pressurizing inlet.

In any of the embodiments described herein, providing pressurized fluid to the first pressurizing inlet can be temporally staggered with respect to providing pressurized fluid to the second pressurizing inlet.

These and other aspects and embodiments of the disclosure are illustrated and described below.

BRIEF DESCRIPTION OF THE DRAWINGS

The invention is described with reference to the following figures, which are presented for the purpose of illustration only and are not intended to be limiting.

FIGS. 1(a)-1(c) illustrates the principle of pneumatic actuation and shows a channel in (a) a resting state, in which the pressure inside the channel ("$P_1$") is equal to the pressure outside the chamber, such as the atmospheric pressure ("$P_{atm}$"); (b) a pressurized state, in which the pressure inside the chamber is greater than the pressure outside the chamber; and (c) in an activated state, in which the pressure inside the chamber is greater than a predetermined threshold ("$P_{th}$"), according to one or more embodiments.

FIGS. 2(a)-2(c) illustrates the principle of pneumatic actuation and shows a channel in (a) a resting state ($P=P_{atm}$); (b) a pressurized state ($P_1>P_{atm}$); and (c) in an activated state ($P_1>P_{th}$) according to one or more embodiments.

FIGS. 9(a)-9(b) are a series of photographs that illustrate the gripping capacity of (a) a low aspect ratio starfish gripper (FIGS. 9(a)-9(c)) by picking up an egg, and (b) a high aspect ratio starfish gripper picking up an anesthetized mouse.

FIG. 20 A-C is an illustration of a bendable tentacle for incorporation into the actuators according to one or more embodiments.

FIG. 21(c) is a perspective view of the assembly of a pleated pneumatic network device including a series of interconnected pleated chambers and a strain resistance sheet, and (d) sealing of the bellow against a Kevlar™/Ecoflex™ flat [arrows indicate direction in which the bellow is applied].

DETAILED DESCRIPTION

Soft robotic actuators find inspiration in nature. For example, animals without skeletons (such as squid and starfish) present new opportunities in robotic structures, and offer solutions to problems such as the gripping of soft or fragile objects that are challenging to address with hard robots. The mechanisms of actuation and locomotion used by squid and other invertebrates often rely on elastomeric (e.g. "soft") structures and on actuation elements (e.g. hydrostats) that are uncommon in vertebrates. Soft actuators use pneumatic or hydraulic systems for movement, provide biomimetic and non-biomimetic structures for actuation, gripping, sensing, locomotion, and other functions.

The fabrication and performance of pressurized networks of channels or chambers (Pneu-nets) embedded in elastomeric bodies are described. The pressurized network actuators can be programmed to change shape and mechanical properties using an external stimulus (in this instance, pressure). The soft robot structures, utilize designs of embedded pneumatic or hydraulic networks of channels in elastomers that inflate like balloons for actuation. A series of parallel chambers embedded within an elastomer can be used as a series of repeating components. Stacking and connecting these repeated components provide structures capable of complex motion. In this type of design, complex motion requires only a single pressure source; the appropriate distribution, configuration, and size of the pressurized networks, in combination with a sequence of actuation of specific network elements, determine the resulting movement. According to one or more embodiments, the soft robotic devices operate without use of rigid weight bearing skeletons.

Figures 1, 22A:
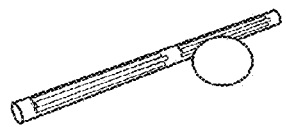
FIGS. 22(a)-22(e) show schematic representations of a Sidewinder soft-robot slithering over terrain and surpassing an obstacle via the Sidewinder's reach, grab, and pull motion.

Soft robots have embedded channels or networks of channels. These embedded channels can be pressurized to provide large and versatile actuation to soft elastomers. The principle of pneumatic (or hydraulic) actuation is illustrated in FIG. 1, in which channel 100 is embedded in a soft rubber (elastomeric) form 110 having a stiffer, yet still pliable backing layer 120. A high elastic modulus is sought for materials used for sections of the network where inflation is undesirable, while a low elastic modulus is used for materials of the network where extensibility is needed. Upon pressurization of the channels via air (pneumatic) or fluid (hydraulic), the soft-elastomer network expands (FIG. 1(b)). The soft-rubber's expansion is accommodated by bending around the stiffer, strain limiting layer (FIG. 1(c)).

As used herein, "stiffness" refers to the resistance of the elastic body to deformation (e.g., extension) by an applied force. In general, elastic modulus is related to, but not the same as, stiffness. Elastic modulus is a property of the constituent material; stiffness is a property of a structure. That is, the elastic modulus is an intensive property of the material; stiffness, on the other hand, is an extensive property of the network and is dependent on the material modulus and the shape and boundary conditions. Because stiffness is a function of the Young's modulus, the material modulus can be used as a comparative measure of the relative stiffness of the channels walls and a predictor of deflection upon pressurization of the channel networks.

Strain is a description of deformation in terms of relative displacement of a body. A deformation results from a stress induced by applied forces, in the case here, for example, by the pressurizing force. Because materials of lower stiffness or smaller elastic modulus will deform to a greater degree than the higher elastic modulus materials, the low stiffness materials experience strain or deformation first. As a result, the strain in the material of higher stiffness or greater elastic modulus is smaller or "limited." As used herein, the layer or wall of the channel that is stiffer, e.g., has a higher elastic modulus, is referred herein to the "strain limiting" layer or wall or membrane.

Specifically, when pressurized, channels will expand in the region 130 that is the most extensible. To accommodate the increased volume that results when the canals expand like balloons, the structure bends in response. From herein, $P_1$ indicates the pressure inside the channel and $P_{atm}$ indicates the atmospheric pressure. Upon pressurization, e.g., $P_1 > P_{atm}$, the channel expands by thinning and elongation of the most flexible (or least stiff) wall 130, which causes the device to bend around the strain limiting layer. Further pressurization, in which case the pressure inside the channel exceeds the predetermined threshold (e.g., $P_1 > P_{th}$), will cause increased expansion of the channel 100 and thin the wall 130, causing the shape to deform nonlinearly (see FIG. 1(c)). The predetermined threshold $P_{th}$ can depend on the material and/or the structure of the channel. In some embodiments, $P_{th}$ can be greater than one atmosphere, e.g., 1.01 $P_{atm}$, 1.1 $P_{atm}$, 1.5 $P_{atm}$, 2 $P_{atm}$, 3 $P_{atm}$, or 5 $P_{atm}$, by way of example.

Qualitatively, the greater the pressurization, the smaller the local radius of curvature at the strain limiting layer 120. Inflation induces concavity in the direction of greatest stiffness. Multiple channels can have an additive effect. In certain embodiments, channels can be interconnected so that the channels can be pressurized simultaneously. In this case, the actuation resulting from pressurizing the interconnected channels is additive in the direction of the repeated sequence. Repeated channels need not be of the same geometry, and a network of channels comprising a number of channels with different geometries and orientations can therefore be used to create a complex movement, or change of the shape of a membrane upon pressurization.

In other embodiments, the device is made up of the same material and its movement is engineered by controlling the relative thicknesses of the embedded channels, so as to obtain regions of higher and lower stiffness. In homogeneous elastomers, such regions are those defined by the thinnest walls (e.g., by the structure with the lowest resistance to stretching). Pressurization and expansion in these regions further thins the walls, and increases the volume of the channel. To accommodate the asymmetric elongation of two opposite walls of the channel, the structure surrounding the expanding volume bends. Upon pressurization, a single channel spanning the length of a rectangular slab causes the slab to bend around the axis of the channel.

In certain embodiments, a wall that is configured to expand upon pressurization, also called an actuating wall, can have a thickness less than 2 mm. In contrast, a wall that is configured not to expand upon pressurization can have a thickness greater than 2 mm. The size of the strain limiting wall can depend on its relative stiffness compared to the actuating wall. For example, if the elastic modulus of the strain limiting wall is substantially greater than that of the actuating wall, then the strain limiting wall can be substantially small. In certain embodiments, the elastic modulus of the strain limiting layer is greater than 1 mega-pascal, whereas the elastic modulus of the actuating wall is in the order of kilo-pascals.

The relative thickness of the actuating wall with respect to the thickness of other walls can impact the actuation characteristics of the actuating wall. For example, if the thickness of the actuating wall is comparable to that of the other walls (i.e., the thickness of the actuating wall is about 95% of the other walls), then upon pressurization, the actuating wall would inflate preferentially. This amount of inflation increases as the difference in the thickness between the actuating wall and the other walls is increased.

Figures 2, 22A:
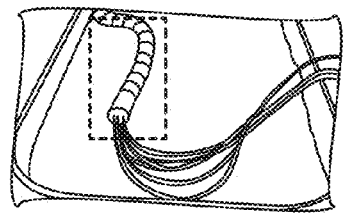
Figures 1, 22B:
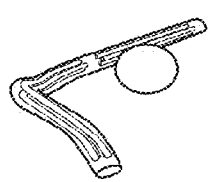
Figures 2, 22B:
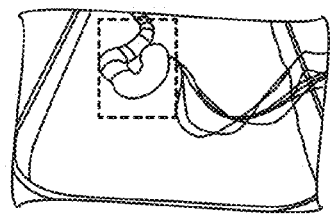
Figures 1, 22C:
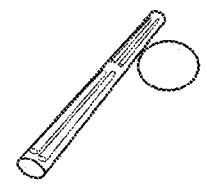
Figures 2, 22C:
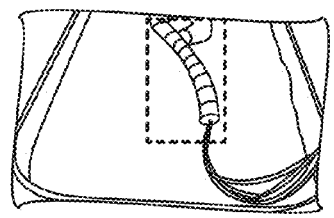
Figures 1, 22D:
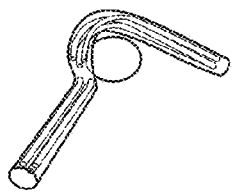
Figures 2, 22D:
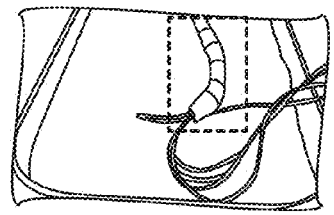
Figure 22E:
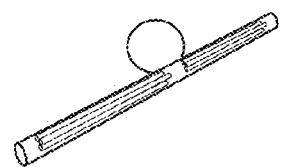

FIG. 2 illustrates this principle, in which channel 200 is embedded in an elastomeric form 210 that is made of the same flexible material. Walls 220 and 240 are thicker than wall 230. When pressurized, channels expand in the direction of wall 230 that is the most flexible. To accommodate the increased volume, the structure bends in response. Upon pressurization, e.g., $P_1 > P_{atm}$, the channel 200 expands by thinning and elongation of the most flexible (or least stiff) wall 230, which causes the device to bend around wall 240 opposite wall 230 (see FIG. 2(b)). Further pressurization, e.g., $P_1 > P_{th}$, will cause increased expansion of the channel 200 and thin the wall 230, causing the shape to deform nonlinearly (see FIG. 2(c)). Qualitatively, the greater the pressurization, the smaller the local radius of curvature at the wall 240 opposite the expanding wall 230.

In more detail, when pressurized, the channels will expand in such a way that the restoring pressure is uniformly distributed: most of the expansion occurs in the most compliant regions (the thin elastomeric films). To accommodate the increased volume of the channel, the structure bends. A single channel spanning the width of a cantilever (see FIG. 1(a)), upon pressurization, will cause the membrane to bend around an axis parallel to the channel (see FIG. 1(b)). In the initial range of small deformations, the mechanical behavior of the structure is similar to that of a simple bimorphic (thermal or piezoelectric) cantilever, and should follow a bending model similar to that of a bimetallic strip (Eq. 1), $$k = \frac{6E_1E_2(h_1+h_2)h_1h_2\Delta\varepsilon}{E_1^2h_1^4 + 4E_1E_2h_1^3h_2 + 6E_1E_2h_1^2h_2^2 + 4E_1E_2h_2^3h_1 + E_2^2h_2^4} \quad \text{(Eq. 1)}$$

where k is the radius of curvature, $E_1$ and $E_2$ are the elastic moduli of the two materials, $h_1$ and $h_2$ are the thickness of the two materials, and $\Delta\varepsilon$ is the difference in strain. Further pressurization will cause increased expansion in this region and thin the walls further, causing the shape to deform nonlinearly (see FIG. 1(c)). Qualitatively, however, the greater the pressurization, the smaller the local radius of curvature. Multiple channels have an additive effect; a network of channels can therefore be used to create a complex movement, or change the shape of a membrane upon pressurization. Quantitatively, the large, non-linear deformation can be accurately predicted using a system of analytical equations or finite element analysis (FEA) models.

In other embodiments, the channel bends in the opposite direction if the sign of the difference in elastic modulus changes from positive to negative. This sensitivity to elastic moduli provides an important tool for tuning the mechanical response of these structures to pressure.

Channels in materials such as used herein can be fabricated by using established techniques of soft lithography. Forming channels in silicones and other elastomers is a well understood, widely used technique in soft lithography and microfluidics and can be applied to the construction of soft robotic pressurized networks. The pressurizable networks are prepared by casting the elastomeric materials in a mold containing the negative replica of the desired features in the structure. Such methods of manufacture permit fabrication of devices having an overall thickness greater than 1 mm and typically having a thickness in the range of 5 mm to 5 cm. Exemplary thicknesses include 2-4 mm, 5 mm, 1 cm, 2 cm, or 5 cm. The relatively large scale of the pressurizable networks (compared to features obtainable, for example, by conventional photolithographic techniques) result in the fabrication of functional devices capable of handling large objects and large loads. By way of example, gripping devices capable of gripping objects greater than 1 cm, or greater than 2.5 cm, or greater than 7.5 cm, or greater than 10 cm are described. In other embodiments, devices capable of handling loads of greater than 80 g, or greater than 100 g or greater than 120 g or greater than 300 g or up to 500 g are described. Embedded channel networks in soft robotics are not limited to large scale and it is contemplated that conventional microfabrication techniques can be used to develop soft robotics on the sub-millimeter scale.

The list of materials that can be used with this technique is extensive and encompasses elastomers such as latex, polyurethanes, silicones, vulcanized rubber for the extensible materials, and fabrics such as paper, Kevlar©, cotton, nylon, etc. for the strain limiting membrane. An exemplary list of material combinations is shown in Table 1. Each combination provides for a varying degree of bending upon actuation, where the bending degree for the same channel material increases, e.g., greater deflection or smaller radius of curvature at the strain limiting layer, with increasing difference in elastic modulus of the strain limiter. Other materials and material combinations will be apparent to one of skill in the art.

TABLE 1

| Channel Material | | Strain Limiting Material | |
|---|---|---|---|
| Material | Young's Modulus (kPa) | Material | Young's Modulus |
| Ecoflex © silicone | ~40 | PDMS | ~400 kPa |
| Ecoflex © silicone | ~40 | Paper | >10 GPa |
| Ecoflex © silicone | ~40 | Plastic sheet | ~0.2 GPa for LDPE ~3 GPa for PET |
| Ecoflex © silicon | ~40 | Woven fiber mesh (fabric) | >70 GPa for Kevlar |
| PDMS | ~400 | Paper | >10 GPa |

The choice of materials, coupled with the design of the channels, determines the response of the device to pressure. The pressure necessary to achieve a particular amplitude of actuation scales with the stiffness of the materials. Each combination provides a different behavior in bending, upon actuation: for the same channel geometry, the bending increases with increasing difference in elastic modulus between the elastomer and the strain limiting fabric (or layer). Effects of material choices is demonstrated with respect to two silicone elastomers (polydimethylsiloxane (PDMS, Dow Corning Sylgard 184) and Ecoflex 00-30 (a siloxane produced by Smooth-On; http://www.smooth-on.com)) because they are readily accessible, are easy to work with, bond well to each other to form multilayer structures, and are relatively inexpensive. However, other suitable material combinations will be readily apparent. PDMS is transparent and has a Shore A hardness of 50. It is elastic and can withstand repeated bending, but fractures above a maximum strain of 150%. As a result, PDMS has a limited range of deformation, and is suited for the more rigid parts of a structure—parts that bend but do not stretch. PDMS can be used as the flexible component, as noted in Table 1, in combination with stiffer materials such as paper. Ecoflex silicone is translucent and has a hardness below the Shore A scale. It fractures above a maximum strain of 900%; it is more flexible than PDMS, and therefore, it is suitable for components with larger strains/displacements (i.e., the layers of actuation). Because it is so soft, Ecoflex silicone, if unsupported, will bend under its own weight (PDMS, much less so). Composite structures, comprising layers of PDMS and Ecoflex silicone, balance the rigidity of PDMS with the flexibility of Ecoflex silicone for the desired function.

In other embodiments, the alternate materials are useful for the fabrication of devices. Composites using paper, textiles, carbon-, glass- or metal fiber as the stiffer material are possible. In other embodiments, stiffness is introduced into a wall of the channel by introducing a reinforcing agent into one wall of the channel. In other embodiments, one wall is chemically treated to increase its stiffness. By way of example, an elastomeric flexible polymer can be impregnated with a polymer precursor solution, which is then cured in a predetermined pattern to form a stiffer polymer.

In other embodiments, the pneumatic network is fabricated as a series of pleated chambers that can be actuated by folding and unfolding of the pleats. As used herein, the term 'pleated' chambers refers to chambers having an arrangement of edges and faces that provide folds that can be reversibly widened and narrowed. The edges experience local strain maxima that are relieved by unfolding when the robot is pressurized. Examples of pleated chambers include bellows and accordion shaped chambers. These actuators have two degrees of freedom—positive curvature upon pressurization and negative curvature upon evacuation (applying a vacuum). Upon pressurization, the pleated chambers can expand from a first smaller volume to a second larger volume. In other embodiments, upon reducing pressure the pleated chambers can contract from a first larger volume to a second smaller volume. The bellow or folded construction of the individual chambers of the pneumatic network provide volume change without stretching or ballooning of the chamber walls. Thus, the materials used in the pleated soft actuators do not require large extensibilities, thus increasing the range of material choices.

Figure 21A:
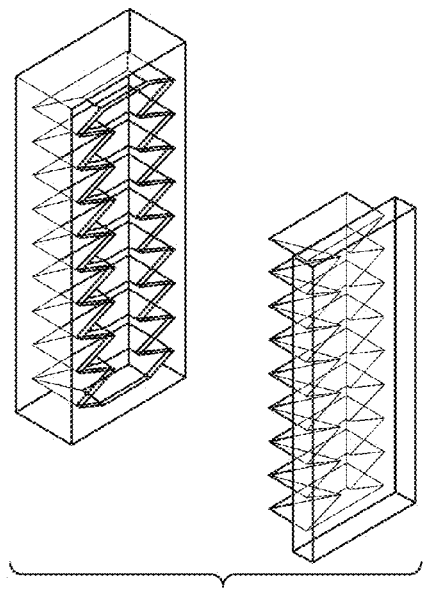
FIGS. 21(a)-21(d) illustrates the structure and manufacture of a pleated pneumatic network device, in which (a) is a two part mold for soft lithography of pleated, bellow structures; (b) illustrates Kevlar™/Ecoflex™ (yellow) pressed into mold and (c) shows a replicated Kevlar™/Ecoflex™ (yellow) bellow [arrows indicate direction in which the (b) mold is applied].
Figure 21B:
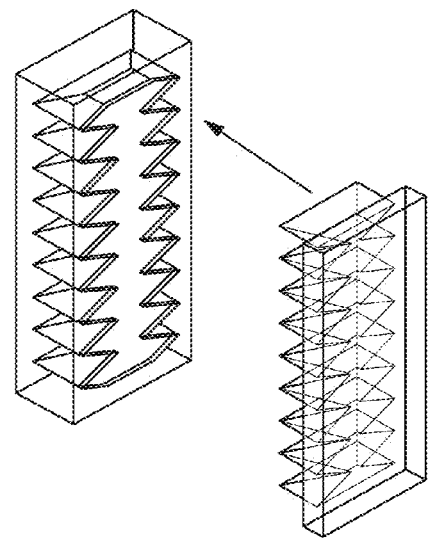
Figure 21C:
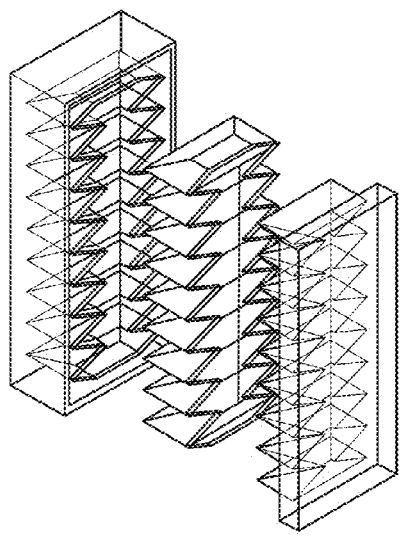
Figure 21D:
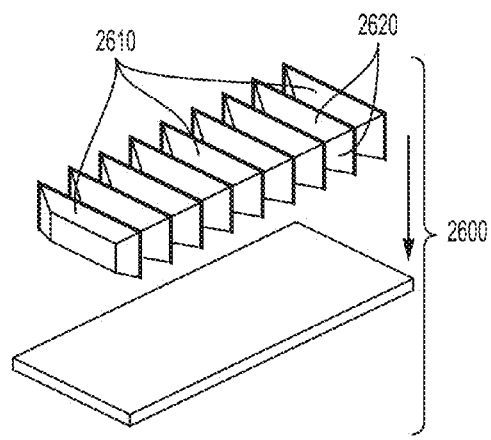

FIG. 21(d) illustrates a pneumatic network 2600 having multiple pleated or bellowed chambers 2610. The chambers 2610 include edges or foldlines 2620 that facilitate the expansion and contraction of the chambers upon pressurization and depressurization. Folds in paper and fabric (e.g., pleating) prescribe the controlled collapse and expansion of bellow structures (e.g., accordions). The molded pleated chambers 2600a are affixed to a strain limiting membrane 2630 to form the pneumatic network 2600.

The pleated chambers can be prepared by casting them in a suitable mold, as is shown in FIGS. 21(a)-21(c). In an exemplary method of manufacture, a two-piece mold is used for form the folded faces of the network, which patterned the exterior and interior pleating as well as pneumatic channels. The outer mold 2640 defines the outer contours of the mold faces and can be filled with the materials used to form the chambers. Once the material is introduced into the outer mold 2640, the inner mold 2650 is inserted at a spacing that sets the wall thicknesses. Once set, the mold can be separated and the molded pleated pneumatic network 2650 is removed. The pleated network 2600a is attached to a strain resistant base 2630.

As described above for previous embodiments, upon pressurization of the channels the pleated network expands. This expansion is limited at the interface of the pleated chambers and the stiffer layer. The pleated chambers expansion is accommodated by bending around the stiffer, strain limiting layer.

However, pleated chambers can also induce bending when pressure is removed from the system. Due to the molding process, the pleated chambers have a set resting volume that spaces apart the faces of the chambers. If a vacuum is applied to reduce the pressure in the chambers, the chambers collapse and the pleated chambers collapse is accommodated by bending around the stiffer, strain limiting layer in a direction opposite that of the expanding chambers.

Pleating provides for large amplitude changes in area using relatively inextensible materials—expanding material opportunities for soft actuators beyond elastomeric material. Exemplary materials suitable for use in pleated pneumatic networks include polyethylene, polystyrene, polymethyl methacrylate, polyethylene terepthalate, and other plastics below their glass transition temperature; additionally, fabrics, such as paper, Kevlar, carbon fiber, and leather.

In some embodiments, the pleated actuators are made of tough composite materials, using soft lithography. For example, the pleated actuators can be made of fabric sheets made of poly-paraphenylene terephthalamide, sold under the tradename Kevlar. Kevlar, when spun into a fiber, has a tensile modulus>3.5 GPa; using this material in soft robotic actuators should greatly improve their sensitivity to puncture from sharp objects In one or more embodiments, the pleated actuators can include reinforcing fibers made from poly-paraphenylene terephthalamide in a polymer base. Though sheets of pure Kevlar™ would be the ideal material choice for puncture resistant actuators, sheeting is not compatible with soft lithography and replica molding In one exemplary embodiment, pleated actuators were fabricated from chopped Kevlar fibers and Ecoflex blend. The resulting paste can be formed into molds, similar to soft lithography. This blended Kevlar™ composite will not be as puncture resistant as pure Kevlar™; however, the blend will be more puncture resistant than pure Ecoflex™.

In certain embodiments, pressure can be supplied using gaseous (pneumatic) or fluid (hydraulic) sources. Pneumatic systems (using compressed air at 7 to 28 kilo-pascal (kPa) or 1 to 10 pound per square inch (psi)) are described by way of example only to illustrate some aspects of the invention.

In some embodiments, the soft robots are powered by an off-board compressed air source connected through flexible tubing. These connectors can be meters long without substantial loss of performance. In other embodiments, soft robots can be powered by an on-board pump. An on-board pump can be electrically powered and may not require external pneumatics (e.g. air compressor). Also, an on-board pump can be a self-powered pump without need of an external power source.

In certain embodiments, the on-board pump can include an on-board air microcompressor. The on-board air microcompressor can include reciprocating diaphragm micropumps such as those available from Takasao Electronics, e.g., SDMP302 standard series piezoelectric micropump.

Some microcompressors can be suitably small, with a volume that is on the order of 3,000 mm$^3$. These piezoelectrically actuated microcompressor can use less than one Watt of power to produce ~1 mL/minute air flow at ~1 kPa.

Figure 3:
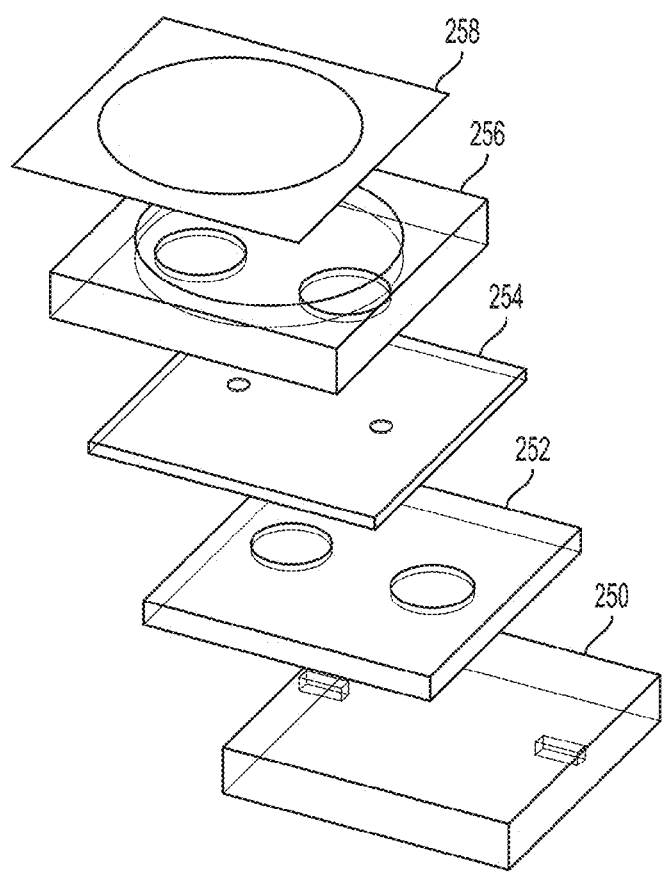
FIG. 3 illustrates an on-board soft microcompressor according to one or more embodiments.

Soft micropumps can be manufactured by incorporating existing reciprocating diaphragm technologies into an embedded elastomer. For example, a soft micropump can include a diaphragm pump, inlet and outlet membrane valves, and micro fluidic channels. FIG. 3 shows an embodiment of a soft micropump in accordance with certain embodiments. FIG. 3 includes a silicone rubber base 250 with inlet and outlet channels, a bottom of polyurethane valve 252, a polyester valve membrane 254, a top of polyurethane valve and air pump chamber 256, and an actuator 258. The actuator can be a piezoelectric transducer (PZT), an electromagnetic solenoid, or a dielectric elastomer actuator (DEA). The complete system can be assembled by bonding pre-patterned layers of silicone and polyurethane elastomers. This system can be designed such that the only rigid component in the assembly is the electrically powered actuator for pumping the air chamber. Because the system can be formed largely with soft materials, soft micropumps can remain functional under large deformations, bending, and changes in orientation.

Figure 4:
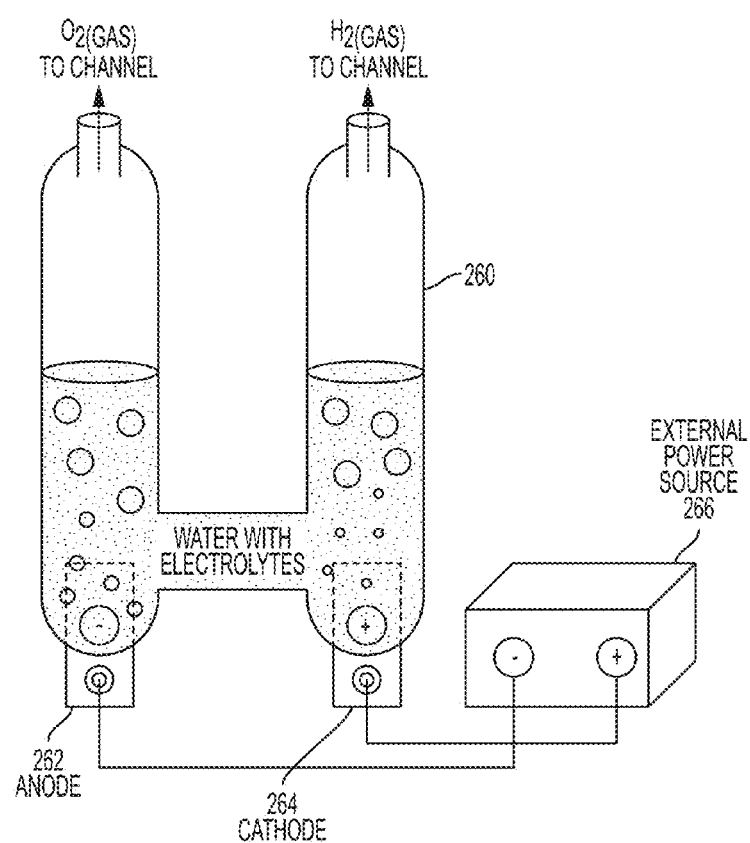
FIG. 4 illustrates a soft electrolytic cell according to one or more embodiments.

In another embodiment, the on-board pump can include an on-board water electrolyzer. For example, an on-board water electrolyzer can use an off-board electric power to electrolyze water carried on board. FIG. 4 shows an on-board water electrolyzer in accordance with certain embodiments. FIG. 4 includes a vessel of two interconnected tubes 260, an anode 262, a cathode 264, and an external power source 266. The anode 262 and the cathode 264 are partially immersed in an aqueous solution of ionic salts contained in a vessel of two interconnected tubes 260. As electric current is passed between the anode 262 and the cathode 264, oxygen is generated from the anode 262, while hydrogen is generated from the cathode 264. Each tube can be connected to the channels of the soft robot to facilitate inflation. Every mole of water (18 grams) can produce 1.5 mole of gas (approximately 33.6 liters under ambient conditions), or roughly 1800 times expansion in volume. In some cases, an on-board electrolyzer cell can generate gas (hydrogen and oxygen) only at the rate of ~5 mL/min. This rate is about 10~50 times lower than desired for the soft robots. The performance of the electrolyzer cell can be improved by increasing one or more of the following: (a) the voltage applied to the electrolyzer, (b) the surface area of the electrodes, (c) the conductivity of the aqueous solution.

It is contemplated that the interconnected channels could also be actuated by hydraulic pressure. It is understood that any embodiment described herein can be actuated by either hydraulic or pneumatic pressure. Unless stated otherwise, reference to pneumatic pressurization or hydraulic pressurization is understood to be reference to pressurization by both methods.

Figure 5C:
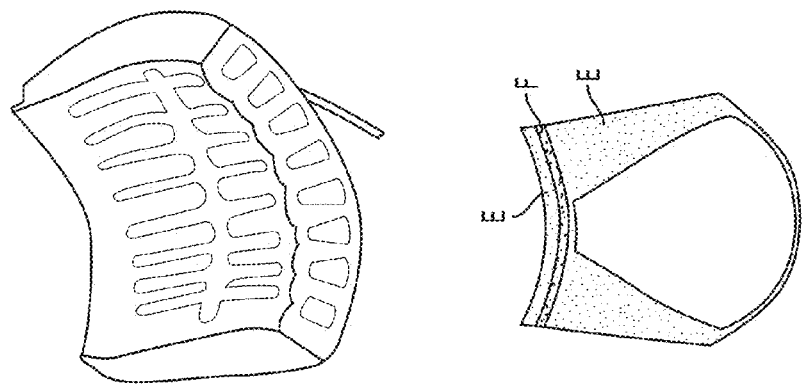
FIGS. 5(a)-5(c) show photographs and related cross-sectional illustrations of a series of pneumatic networks with different materials, such as (a) Ecoflex silicone (a siloxane produced by Smooth-On; http://www.smooth-on.com), (b) Ecoflex silicone and polydimethylsiloxane (PDMS), and (c) Ecoflex silicone and a polyester fabric, illustrating different responses to pressurization.
Figure 5B:
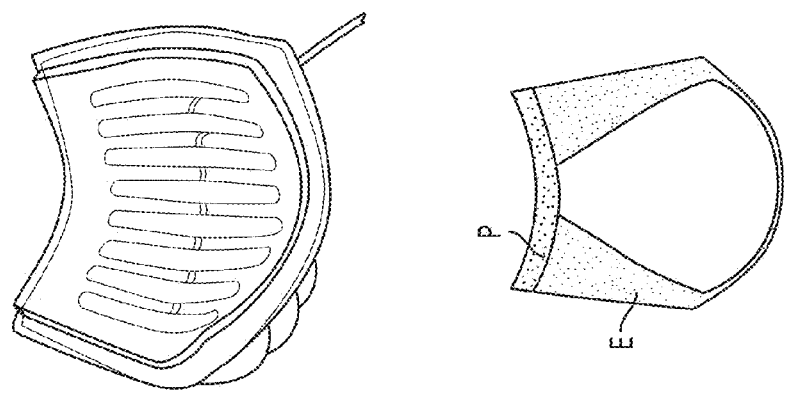
Figure 5A:
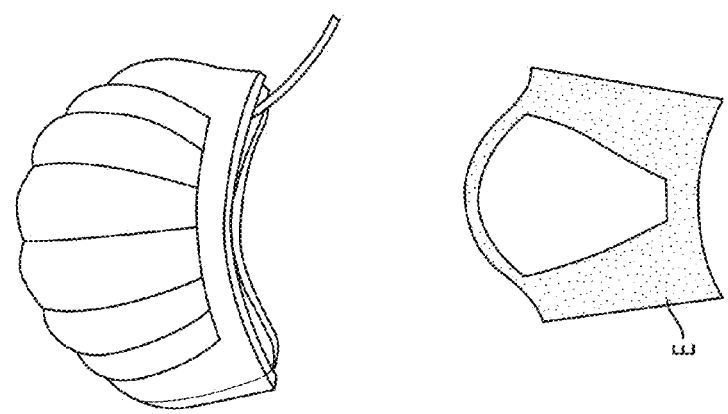

FIGS. 5(a)-5(c) illustrate three devices having channels with the same unpressurized geometries and dimensions, but with different responses to pressurization. In certain embodiments, as shown in FIG. 5(a), a device can be formed using a single material, such as Ecoflex. The actuating wall and the strain-limiting wall of the device can be formed by varying the thickness of the material. For example, a strain-limiting wall can be formed using the thickest layer of Ecoflex silicone (E) (i.e., bottom layer) and the actuating wall can be formed using the thinnest layer of Ecoflex (i.e., upper layer). If the thickness of the strain-limiting layer is a few % thicker than that of the actuating wall, the device would bend around the strain-limiting wall. The typical thickness of the strain-limiting wall ranges between 1 mm and 1 cm. On pressurization, the device forms a convex shape. The inflated device is shown in the upper photograph and a cross-sectional view of the inflation is shown in the lower illustration.

In certain embodiments, as shown in FIG. 5(b), a device can include two different materials, one material forming the actuating wall and another material forming the strain-limiting wall. For example, the material forming the actuating wall includes Ecoflex silicone (E) and the material forming the straining-limiting layer includes the PDMS (P; thickness of about 1 mm). Because the PDMS has a higher elastic modulus compared to that of the Ecoflex, any thickness of the PDMS would cause the Ecoflex to bend around the PDMS layer. Thus, although the PDMS is the thinner layer, it is stiffer than the Ecoflex layer. Therefore, upon pressurization, the device actuates opposite of that shown to the left and forms a concave shape. Again, the inflated device is shown in the upper photograph and a cross-sectional view of the inflation is shown in the lower illustration.

In certain embodiments, as shown in FIG. 5(c), a polyester fabric (F) is embedded in the softer more flexible channel material Ecoflex silicone (E) to form the strain-limiting layer and the device also formed a concave shape. As noted previously, the inflated device is shown in the upper photograph and a cross-sectional view of the inflation is shown in the lower illustration. The devices in FIGS. 5(a)-5(c) were 5 cm×5 cm×5 mm when not pressurized.

The molded section can be secured to the stiffer base using conventional methods, including using dovetail joints, compression fittings, soft seals, magnetic attachment, clamps and ties. In one or more embodiments, layers of different materials can be adhered using a small molecule silicone precursor, e.g., and adhesive. First, a small molecule silicone precursor can be layered onto a first layer of material. Then, a second layer of material can be placed on top of the first layer of material with the silicone precursor. The composite material is then placed into the oven to cure and glue the layers. In certain embodiments, the composite material can stick better when the composite material is left outside for several hours before being placed into the oven. This way, the silicone precursor can migrate into the first and the second layer of materials to create a precursor infused interlayer.

In one or more embodiments, when one or more layers include papers, the layer of paper can be adhered to other layers using a sacrificial wax layer. For example, suppose that a first layer includes a paper and a second layer includes elastomer. First, a sacrificial wax layer can be placed on top of the first layer. The sacrificial wax layer can be in the shape of the desired pneumatic network. Then the elastomer can be poured over the sacrificial wax layer so that the elastomer would imbibe into the paper. Lastly, the sacrificial wax layer can be melted so that the elastomer can firm stick to the paper.

In one or more embodiments, master molds can be prepared readily and at low cost using a low-cost 3D printer (Elite; Dimension Systems). These devices can range in size from 1 mm$^3$ to 8×8×12 cubic inches; however, scaling the mold (and hence the actuator) to larger or smaller dimensions is possible using conventional 3D printer technology and equipment. Other conventional mold and casting techniques can be used. The pneumatic channel network can have minimum channel dimensions of 0.125 mm$^3$ to, practically, 3×8×4 cubic inches while still having a suitable channel network; again, based on the capabilities of a low-cost 3D printer. Other dimensions and volumes are possible using conventional mold and casting techniques. The typical wall thickness ranges between 1 mm and 1 cm. In order to make it twice as difficult for a channel to expand, increasing the channel thickness by twice the amount is sufficient. Alternatively, the channel walls can be strengthened using the methods described herein or using other conventional methods. A wall thickness of 1 cm sees little expansion under the lower pressures (<5 psi) used by in Ecoflex silicone networks. Therefore, using only material thickness to define bending, a range from 1 mm to 1 cm of thicknesses is sufficient in one or more embodiments. The available radii of curvature is infinite for an unpressurized flat sheet to ~3-5 mm for the textured fingers of a high aspect ratio starfish finger.

Passive and active loading capacity of actuators (the maximum sustainable load) correlates to the stiffness of the materials used for fabrication—stronger materials are able to support larger loads, but typically cannot sustain very large strains. Agility—the ability to create intricate movements, and to do so rapidly—requires bending to small radii of curvature, and is thus easier to achieve in materials able to sustain high strains.

Bending Components

The bending mechanisms described above can be used to fabricate a device that is configured to bend and/or twist. Such devices can be long or extended in length so that the device forms a bendable actuator or "finger." If secured at one end, such devices can also serve as a cantilever.

Figure 6A:
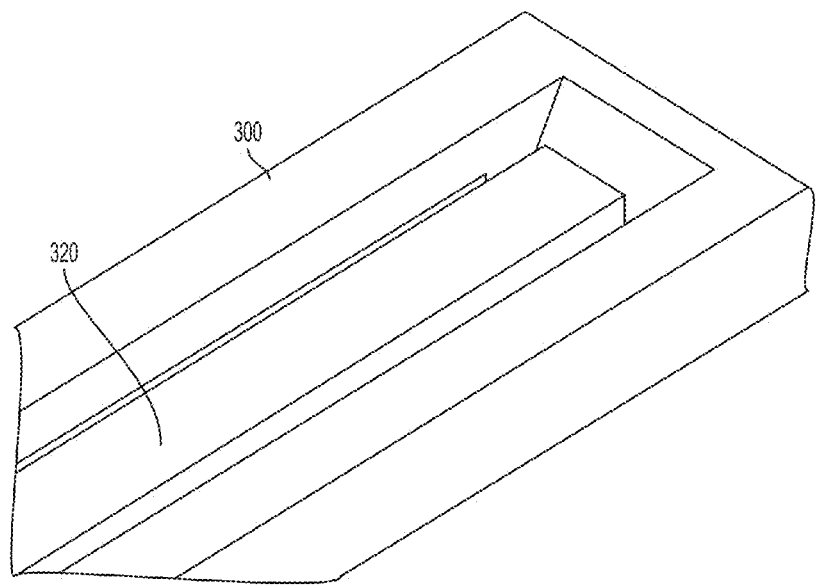
FIGS. 6(a)-6(f) illustrate the relationship between negative mold patterns and actuator motion, in which (a) is a negative mold for a soft robot having a single channel; (c) is a negative mold for a soft robot having multiple interconnected channels running transverse to the length of the robot; (e) is a negative mold for a soft robot having multiple interconnected channels running at an angle to the mold length; and (b), (d) and (f) are photographs of soft robots bending (i.e., being actuated) in accordance to the programmed relief patterns present in the respective molds, according to one or more embodiment.
Figure 6B:
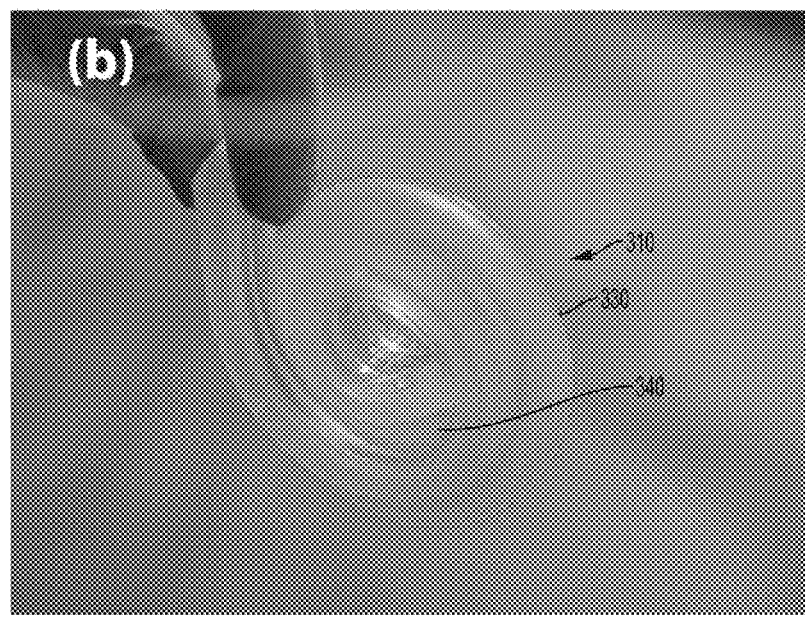

FIG. 6(a) is an illustration of a mold 300 used to prepare the single channel device 310 of FIG. 6(b). The mold can include a single block pattern 320 that is configured to define a cavity 330 along the length of the device. The cavity can be the channel of the device. Adhesion to a sealing membrane 340 completes the channel. The pressurizable network can have a thickness that is greater than 1 mm and typically in the range of about 5 mm to 5 cm. By uniformly patterning the channel mold as a complete solid, as shown in FIG. 6(a), there is no bias in material compliance under pressurization. A negative replica conduit (not shown) is also included in the mold to create an inlet for pressurizing the device. In certain embodiments, a tubing can be inserted in the inlet to deliver air for actuation. The tubing can include a polyethylene tubing. The tubing can also be any other tubing that can provide sufficient compression of the elastomer for a soft seal. Upon pressurization, this device would bend in-plane, as shown in FIG. 6(b). As in FIG. 5(a), the direction of bending is determined by the dimension of the greatest expansion. As the greatest expansion occurs normal to the plane of the patterned feature, it is possible to logically program how the actuator bends.

Figure 6C:
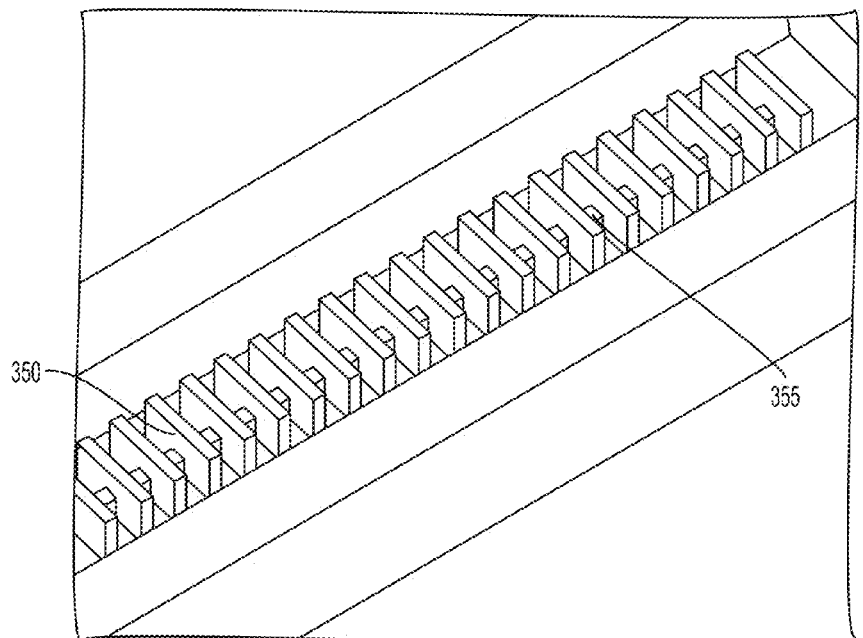
Figure 6D:
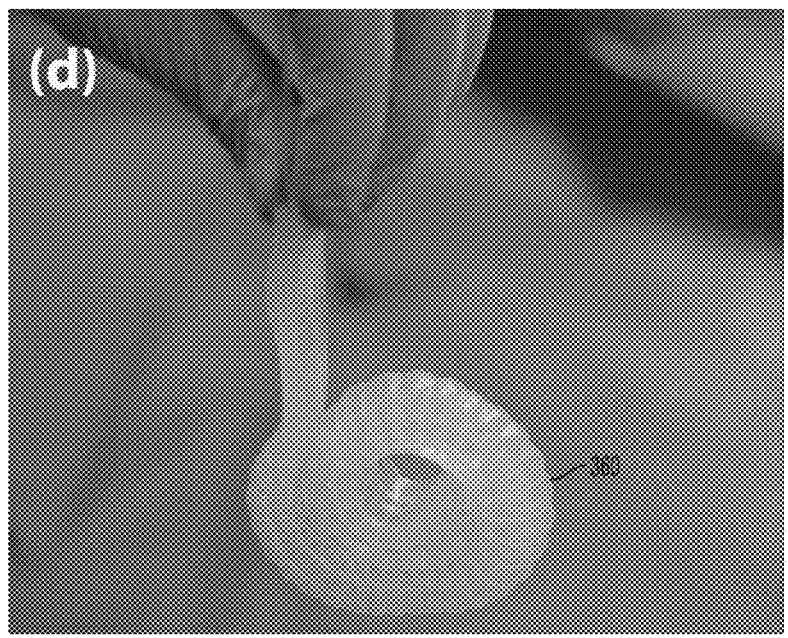

In certain embodiments, a device with a similar bending mode can include a pattern in the inner walls of the cavity. This channel pattern can be introduced using a mold with a pattern-defining structure. The pattern-defining structure in the mold can include a fishbone pattern 350 as shown in FIG. 6(c). The fishbone pattern 350 can include a series of smaller interconnected channels whose longitudinal axes are perpendicular to the longitudinal axis of the overall device, e.g., smaller channels are perpendicular to the length of the device. The fishbone pattern 350 can be oriented perpendicular to the longitudinal axis of the mold (thus, the molded device). When a device is molded using this mold, the device would include a cavity having the fishbone pattern in its interior wall. The fishbone pattern in the cavity's interior wall can be characterized by dents along the longitudinal axis of the cavity. In other words, a cross-section of the molded device, taken along the longitudinal axis of the device, would exhibit a bellow-like pattern. Hereinafter, a cross-section of the molded device, taken along the longitudinal axis of the device, is called an longitudinal cross-section. This cavity can form the pressurizable network 360 of the device. This resulting pneumatic network 360 includes a plurality of interconnected channels formed by the pattern of the cavity. When the pneumatic network is pressurized, the device would bends along an axis perpendicular to the longitudinal axis of the device and along the longitudinal axis of each channel, as shown in FIG. 6(d). The pressurizable network can have a thickness that is greater than 1 mm. In certain embodiments, the thickness of the pressurizable network can be in the range of about 5 mm to 5 cm.

In certain embodiments, a device with a desired range of actuation can be designed. The design can be based on the mechanism that a greater expansion of the molded device would occur normal to the pattern of the cavity. When the cavity patterns, such as the fishbone patterns, are at an angle of zero degrees, the axes of the interconnected channels are aligned with the longitudinal axis of the device. Therefore, the resulting device would move similarly to a single channel shown in FIGS. 6(a)-6(b). In contrast, when the cavity patterns are at an angle of 90 degrees, the axes of the interconnected channels are perpendicular to the longitudinal axis of the device. Therefore, the device would move as shown in FIGS. 6(c)-6(d). The reason FIG. 6(c) behaves similarly to FIG. 6(a) is that each channel adds a force along the longitudinal axis of the device. Therefore, by engineering the amount of force along the longitudinal axis of the device, one can build a device with a desired amount of bending motion.

In embodiments disclosed with respect to FIGS. 6(a), 6(c), the movement of the device has been limited to a single plane. In other words, the movement of the device is constrained to bending and does not include any twisting movements. In one or more embodiments, a device can be configured to move in a twisting manner by introducing certain patterns to the interior of the cavity. For example, the pattern can include a fishbone pattern that is oriented at an angle of between 0 degrees and 90 degrees with respect to the longitudinal axis of the device. The fabricated device ("finger") can curl around an axis perpendicular to the length of the device. Networks that coil as a helix use channels that are at an angle with respect to the longitudinal axis of the finger. By aligning the interconnected network of channels so that the longitudinal axes of the channels are at an angle between 0 degrees and 90 degrees with respect to the device length, the bending results in a helical out-of-plane bending. In one or more embodiments, the channel angle θ can be in the range of 0<θ<90 degrees. In one or more embodiments, the channel angle is about 10, about 15, about 20, about 25, about 30, about 35, about 40, about 45, about 50, about 55, about 60, about 65, about 70, about 75, about 80, about 85 or about 90 degrees. In one or more embodiments, the angle is in the range of about 30 to 60 degrees.

Figure 6E:
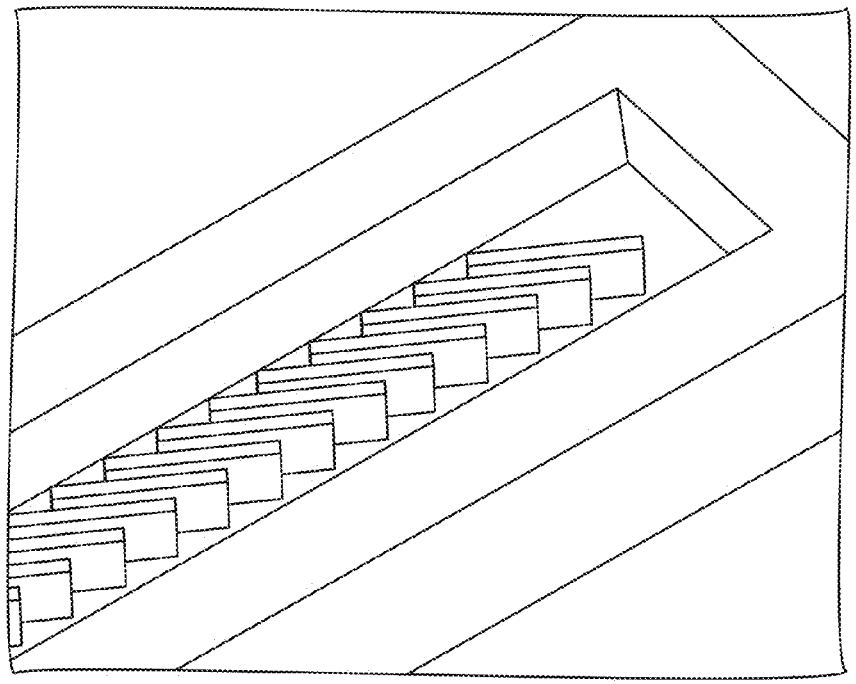
Figure 6F:
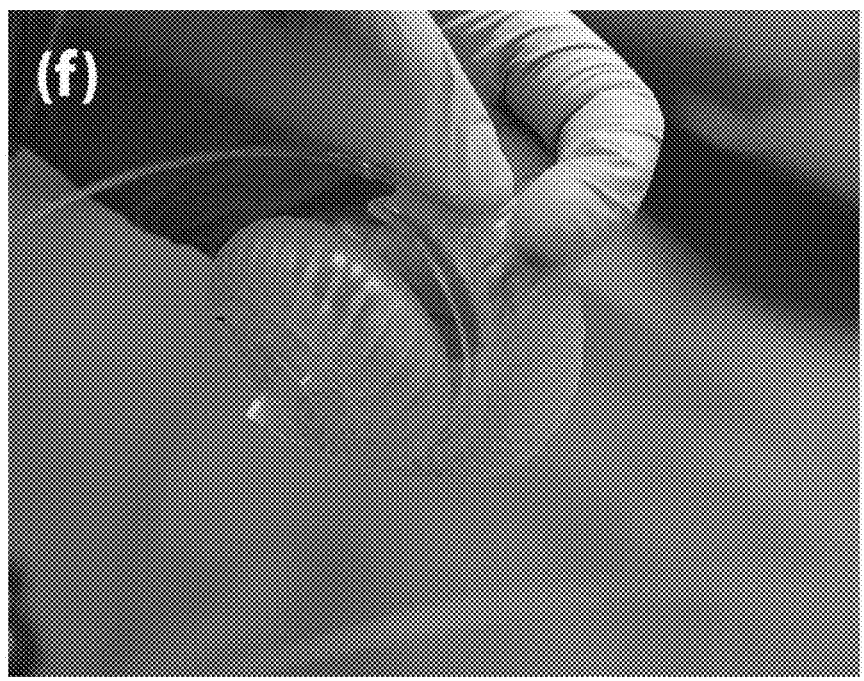

The pressurizable network can have a thickness that is greater than 1 mm and typically in the range of about 5 mm to 5 cm. Each of the channels can expand in a direction around its longitudinal axis, but because each channel is at an angle, the net effect is a twisting bend. Helices can be either right-handed or left-handed. With the line of sight along the helix's axis, if a clockwise screwing motion moves the helix away from the observer, then it is called a right-handed helix; if towards the observer then it is a left-handed helix. The handedness (right or left) of the structure is determined by angle of the channels (positive or negative) with response to the longitudinal axis of the device. In addition, the magnitude of the angle (or size of the radius of curvature) will determine the distance between turns in the helix (twist distance). The pitch of a helix is the width of one complete helix turn, measured parallel to the axis of the helix. For example, by patterning channels with a 60 degree angle to the length of the actuator, using a mold such as shown in FIG. 6(e), the expansion normal to the channels creates an out of plane helix bending mode under actuation, as shown in FIG. 6(f). In order to create a device that twists in the opposite direction the channels are positions with a −60 degree angle with respect to the longitudinal axis of the actuator.

The greater the channel number, the higher the resolution of programming complex bending moments. The greater the channel volume, the less pressure is needed to achieve the same degree of bending due to there being less resistance to inflation; however, the actuators become more sensitive to delamination when there is a larger of channel volume. Therefore, when operating at pressures approach 10 psi, less channel volume is desired to reduce the probability of bursting, but more channel volume is desired when low pressures are used (a single channel can bend significantly with 3 psi (FIG. 6(b)).

In one or more embodiments, the actuator can be designed to bend in more than one direction or in more than one way. Multiple bending modes can be achieved by integrating multiple sets of interconnected channels. Each set of interconnected channels can be capable of bending the strain limiting membrane in a different direction or in deforming a different portion of the strain limiting membrane. The sets can be connected together so that they actuate together, or they can be isolated, each with their own actuator, so that they can be independently actuated.

In certain embodiments, a mold can be configured to define a cavity having a desired geometry. For example, the mold can be configured to form a tube-like cavity in the molded device. In other words, the cross-section of the cavity, taken perpendicular to the longitudinal axis of the molded device, can be a circle. Hereinafter, a cross-section of the molded device, taken perpendicular to the longitudinal axis of the device, is called a perpendicular cross-section. The mold can be configured to define a cavity whose perpendicular cross-section is an arbitrary shape. The arbitrary shape can include a triangle, an equilateral triangle, a square, a rectangle, a pentagon, a hexagon, and a circle. The mold can also have a pattern-defining structure that would form dents or patterns in the interior wall of the cavity. In other words, the longitudinal cross-section of the cavity can exhibit a pattern. In some embodiments, the longitudinal cross-section can mimic a wave with crests and troughs. The dents or patterns in the interior wall of the cavity can define the interconnected channels.

The dents or patterns in the interior wall of the cavity can be formed using an etching technique. In some embodiments, a mold similar to FIG. 6(a) can form a molded device with a cavity, where the interior wall of the cavity does not include any patterns. This device can be cut open, for example, by a knife, and laid open (i.e., inside-out) so that the interior wall of the cavity is exposed. Then the interior wall of the cavity can be etched using well-known etching techniques, including a laser etching technique, a dry etching technique, a photo etching technique, and an electron beam etching technique. Once the interior wall of the cavity is etched, the molded device can be rolled back and adhered. The resulting device would include a cavity with a patterned interior wall. In other embodiments, a pattern can be etched on a flat sheet of elastomer, using etching techniques listed above. Then the patterned elastomer can be rolled up to create a cavity with a patterned interior wall.

In certain embodiments, a flexible molded device, with a cavity having an arbitrary perpendicular cross-section, can include a strain-limiting membrane (i.e., a thin segment) and an actuating strip. In certain embodiments, the strain-limiting membrane and the actuating strip can be formed using two different materials, one material defining at least a portion of a strain-limiting membrane and the other material defining at least a portion of an actuating membrane. For example, a portion of the molded device along its longitudinal axis can include a material with a high elastic modulus, defining a strain-limiting membrane. Likewise, a portion of the molded device along its longitudinal axis can include a material with a low elastic modulus, defining an actuating strip. In some embodiments, the strain-limiting membrane and the actuating strip are in a facing relationship.

In certain embodiments, the strain-limiting membrane and the actuating strip can be formed using the same material. For example, a portion of the molded device along its longitudinal axis can be thicker than the rest of the longitudinal strips, defining a strain-limiting wall. Likewise, a portion of the molded device along its longitudinal axis can be thinner than the rest of the longitudinal strips, defining an actuating wall. In some embodiments, the pattern of the cavity along the longitudinal axis of the molded device can introduce wall thickness variations. Therefore, the strain-limiting wall and the actuating wall can be defined by the cavity pattern.

Figure 7:
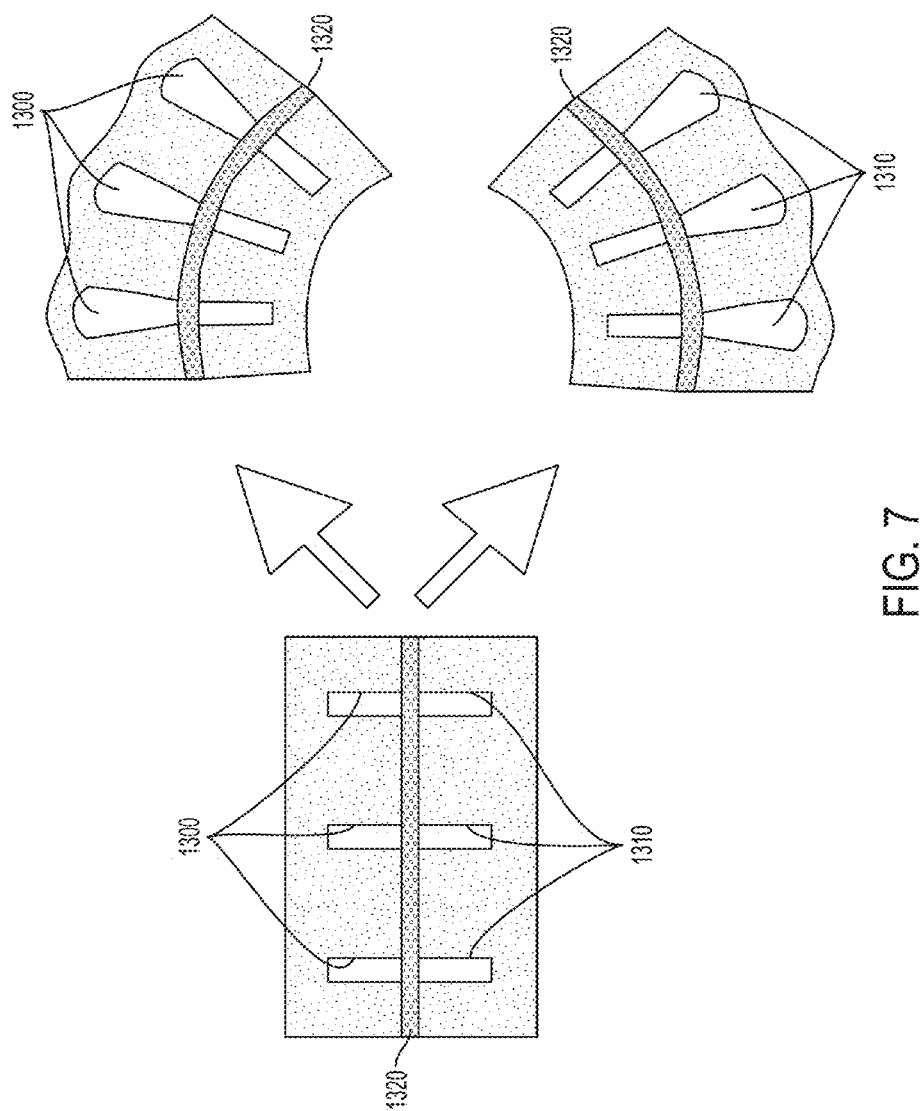
FIG. 7 illustrates an actuator device according to one or embodiment, in which two sets of interconnected channels are secured on opposing sides of a sealing membrane/strain limiting membrane to provide bending in two directions.

In some embodiments, the actuator device is equipped with a pneumatic channel on both sides of a stiff sealing membrane. The device can bend in different directions depending on which pneumatic network is pressurized. FIG. 7 illustrates an actuator device in resting position, in which two sets of interconnected channels 1300, 1310 are secured on opposing sides of a sealing membrane/strain limiting membrane 1320. Each of the sets of interconnected channels can be operated separately by selective pressurization through individual pressurizing inlets or simultaneously actuated through a common inlet (not shown). When channels 1300 are pressurized as is shown in FIG. 7, strain limiting membrane 1320 is deflected or bent away from the channels 1300. Similarly, the device can be bent in the opposite direction by pressurizing channels 1310, as shown in FIG. 7.

Figure 12C:
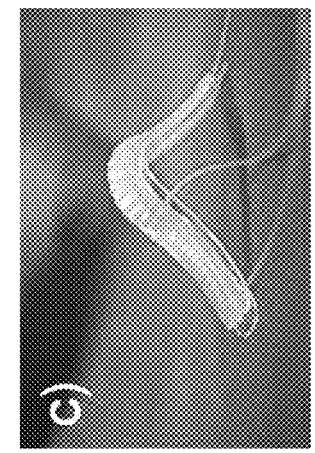
FIGS. 12(a)-12(f) are a series of photographs that illustrate the operation of a linear assembly that is capable of movement according to one or more embodiments.
Figure 12B:
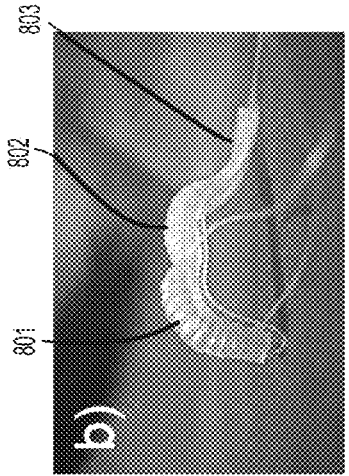
Figure 12F:
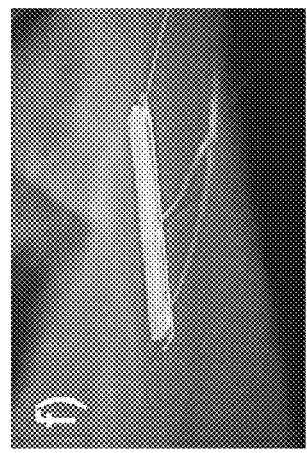
Figure 12E:
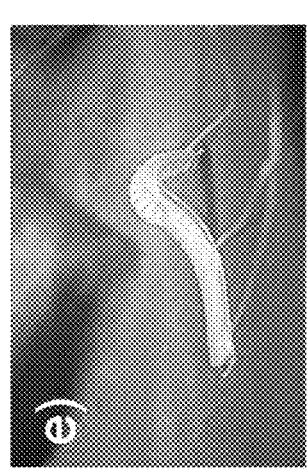
Figure 12A:
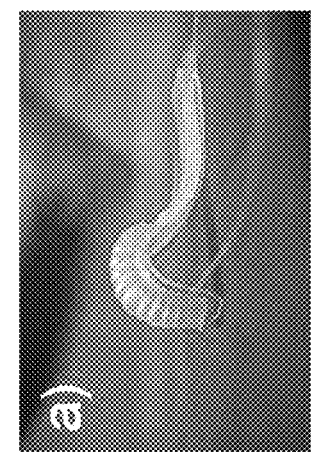

In other embodiments, a series of interconnected channel segments can be linearly assembled to create soft robotic devices that are capable of complex movement. FIG. 12 illustrates one embodiment in which three individually pressurizable channel segments are lined up on a single sealing membrane/strain limiting membrane. FIGS. 12(a), 12(c), and 12(e) show each of the individual channel segments being separately pressurized.

Complex Motion Devices

Pneumatic networks can generate a wide (if not unlimited) variety of movements. The fundamental bending components described herein can be assembled into more functional devices. Combinations of multiple elements in a single structure forms networks that are capable of complex movement.

A fully soft robotic gripper provides a demonstration of the class of soft structures that can be generated with these methods. A gripper includes two or more bending elements or "fingers" that are capable of coordinated bending and straightening in order to grip and release an object. In some embodiments, the actuators are arranged around a central pivot point or region. The actuators can be symmetrically or asymmetrically arranged. For example, fingers can be arranged as human hand, with opposable fingers, or they can be arranged around a central point, as a starfish.

Figure 8A:
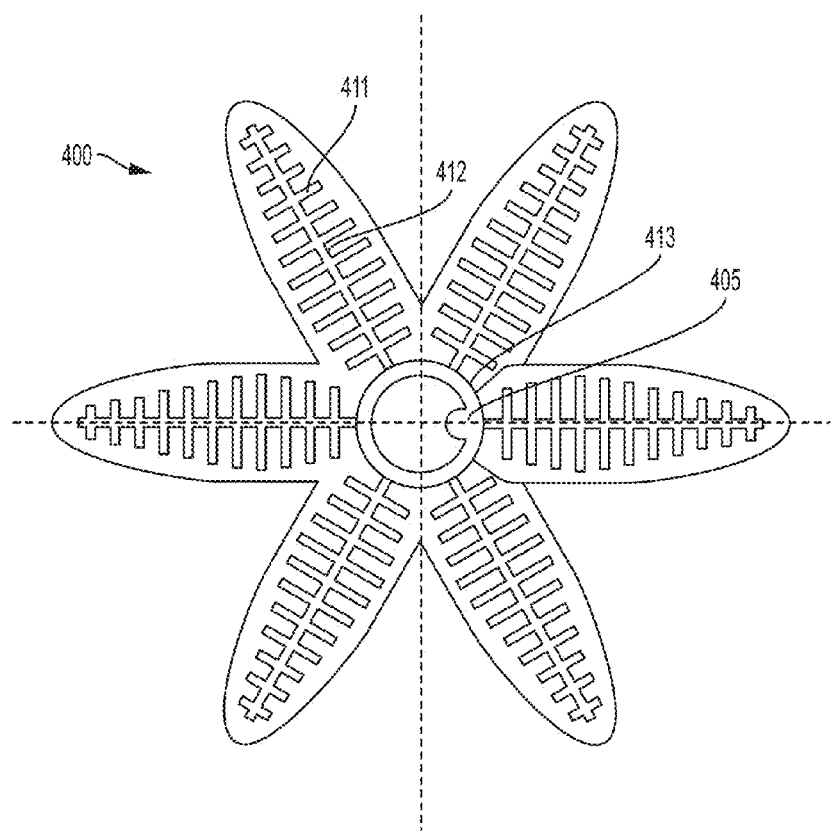
FIGS. 8(a)-8(c) illustrate the manufacture and operation of a gripping device having multiple, independently prepared, and joined layers according to one or more embodiments.
Figure 8B:
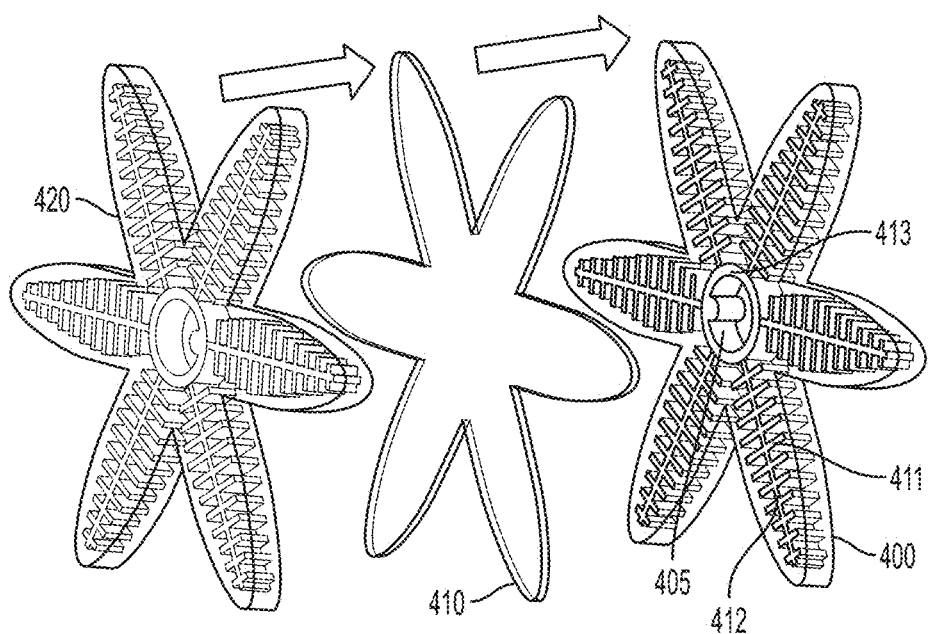
Figure 8C:
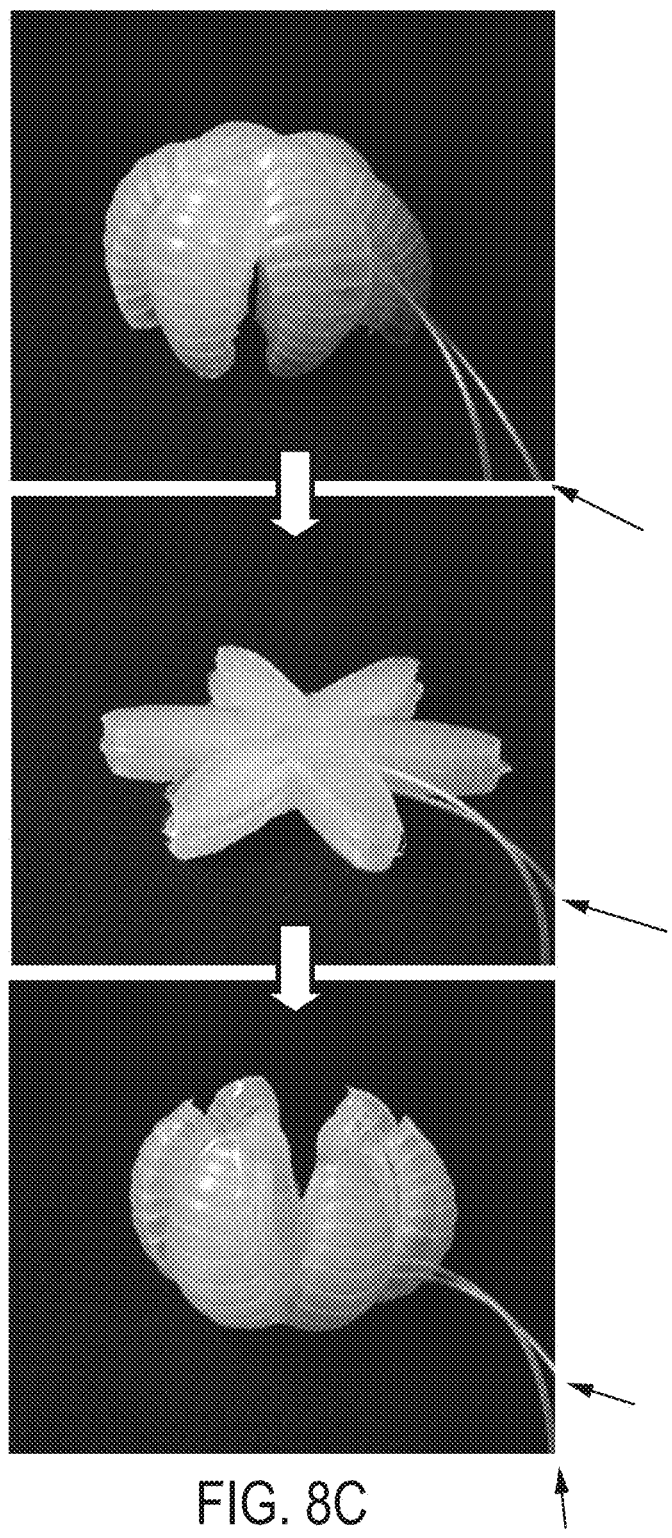

In one embodiment, a starfish-like structure shown in FIG. 8(a)-8(c) is obtained by arranging a plurality of bending elements (e.g., 5-6 bending elements) in a radial fashion around a common pressurizing inlet. This gripper incorporates a starfish-like structure with pneumatically-driven soft actuators fabricated in elastomeric composites. When compressed air pressurizes the network of channels, the soft actuators bend, extend, or contract to a pre-programmed shape.

As described above, bending actuators can be made from a single material (monolith) as shown in FIG. 2; it can be a composite structure as shown in FIG. 1. Structures can have, for example, a single bending mode (FIG. 1), or multiple bending modes (FIG. 7).

In one embodiment, a starfish shaped channel member is cast to provide a series of interconnected channels, such as is shown as molded layer 400 in FIG. 8(a). FIG. 8(b) shows exemplary molded layers with the channels filled with dye for easier viewing. The individual channels 411 are shown aligned in a cross bar relationship. A pressurizing conduit 412 runs along the length of each starfish arm to connect the individual channels. A centralized pressurizing ring 413 connects each of the arm system of channels. In one embodiment, the channels are connected to a common inlet 405, so that the channels in all 6 arms are pressurized at the same time.

Referring to FIG. 8(b), the molded layer 400 is then bonded to sealing membrane 410 having greater stiffness (higher Young's modulus) to form the plurality of interconnected cavities. In this particular embodiment, the arms of the starfish are prepared as a single mold; however, the arms could be individually assembled and/or each arm cold have its own set of interconnected channels that are actuated independently of the other arms. When actuated, in this particular embodiment, all arms of the gripper bend in the same direction. In other embodiments, each arm of the starfish gripper can be independently pressurized; in which case each arm includes a separate pressurizing conduit and each arm can bend individually, in the same or different direction. The use of 5-6 gripper arms is arbitrary and other arrangements are contemplated. For example, grippers with 2, 3, 4, 5, or greater than 6 arms are contemplated. In addition, the gripper arms can be evenly or unevenly spaced around a central axis. By way of example, the gripper can have 5 arms that are spaced around a central axis to provide the gripping action typically achieved by the human hand.

Multilayer structures, where layers of interconnected channels, e.g., active layers capable of activation, sandwich strain limiting layers, e.g., membrane layers of greater stiffness, can form devices with even greater ranges of motions. A three-layer starfish-like structure consisting of two active layers 400, 420 separated by a single strain limiting membrane 410 is illustrated in FIG. 8(b). The channels in layers 400 and 420 have separate pressurizing inlets and can be activated separately. Each of the top and bottom layers 400, 420 contains a set of embedded interconnected channels, which run almost the entire lengths of the arms. Between these two molded layers, a flat membrane 410 of higher stiffness serves to seal both sets of channels and also serves as a separation layer. The channels can be visualized in FIG. 8(a) where the channels are filled with dye. The tip-to-tip diameter is 9 cm in this particular example; however, the gripper size can range from 1-2 cm to 15-25 cm.

By actuating the individual networks, the device can change its curvature from convex to concave as illustrated in FIG. 8(c). The arrows indicate small polyethylene tubes used to supply compressed air for actuation. With reference to FIG. 8(c), the photographs demonstrate the fabricated device with a wide range of curvature achievable by curling upwards or downwards (from concave to convex), depending on which of the two compressed air lines is used. The gripper is shown at rest in the central photograph of FIG. 8(c). When the upper channels of layer 400 are pressurized, the gripper takes on the convex shape shown in the upper photograph of FIG. 8(c). When the upper channels of layer 410 are pressurized, the gripper takes on the concave shape shown in the lower photograph of FIG. 8(c).

The freedom to design each layer separately, and then join them in a single device, makes it possible to tailor the structure of each part to achieve a function. In each of the embodiments described herein, it is also possible to individually actuate each arm of the gripper for even more complex movement.

In certain embodiments, the gripper can have longer but thinner arms compared to the embodiment shown in FIG. 8(c). The longer and thinner arms can enable gripping larger, irregularly shaped objects. The radius of curvature for the gripper arms can be smaller than that of the device in FIG. 8(c). The bending radius can vary from +5 mm to an infinite radius (i.e., flat sheet) and then to a −5 mm radius in the case of two bending actuators sandwiched together. The arms in the gripper can be designed to suit a particular application of interest.

Figure 9B:
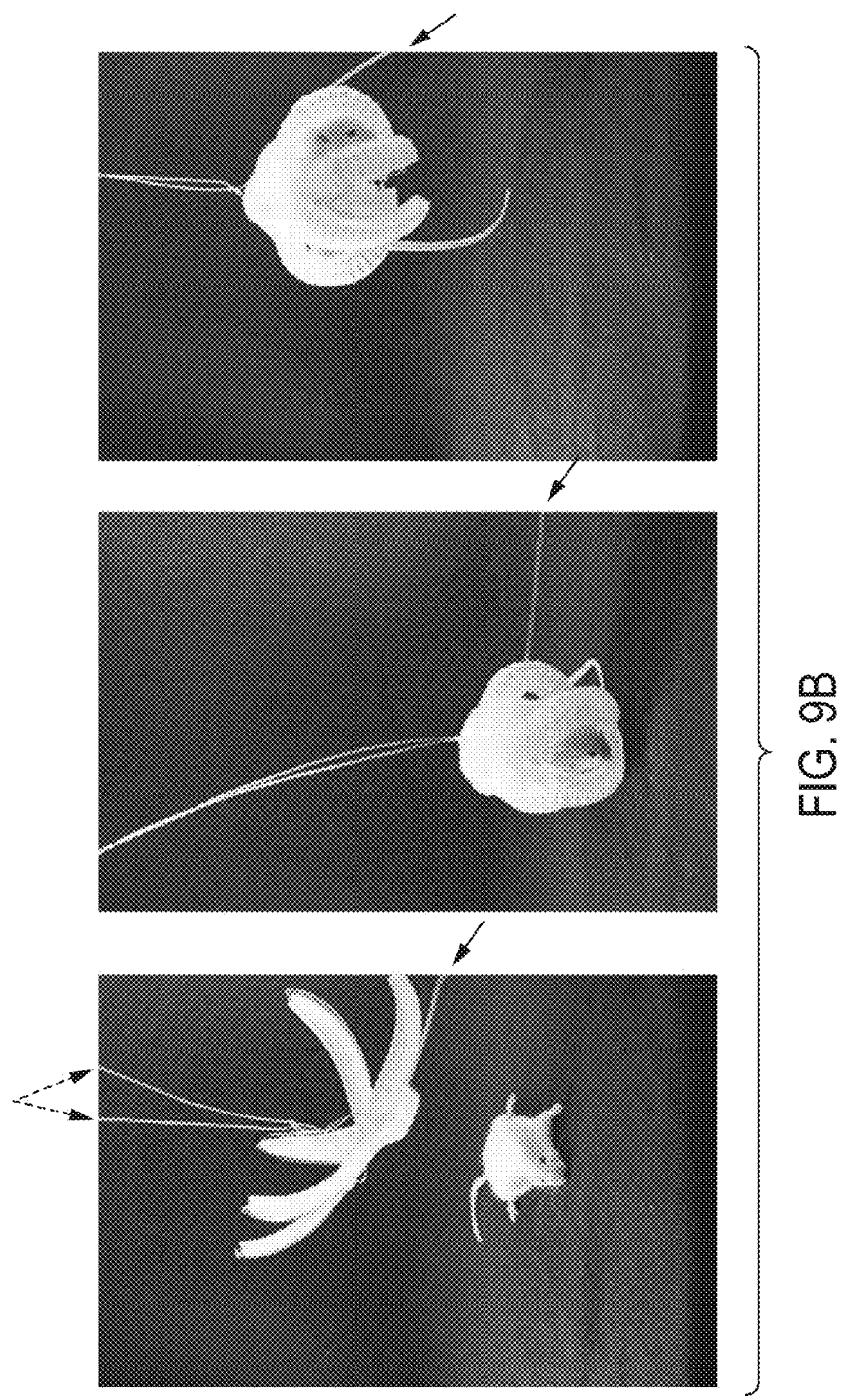

The gripping motion has been demonstrated to pick up objects. When pressure is applied to the channels in the top active layer of the starfish gripping device, the arms curled downward and away from the pressurized layer. The actuated gripper by the effective curling of the six arms was capable of gripping objects such as an uncooked egg and an anesthetized mouse (FIGS. 9(a)-9(b)). The soft gripper did not damage/harm the egg or the mouse during manipulation. FIG. 9(a) shows a 9-cm tip-to-tip starfish gripper (e.g., FIG. 8) gripping an uncooked chicken egg. A string (indicated by dashed arrow) suspends the gripper and assists in lifting the egg; a tube, visible on the left side of the gripper (indicated by solid arrow), runs into the central portion of the gripper to provide pressurized air for actuation. FIG. 9(b) shows a modified version of the starfish-based gripper with 14-cm tip-to-tip distance. As shown, thinner and longer fingers can pick up a live anesthetized mouse; here also, a string (dashed arrow) suspends the gripper, and a tube (solid arrow) from the side provides compressed air.

In certain embodiments, techniques and features can be incorporated into the actuator device to enhance the functionality of the actuators and resulting devices. For example, a multilayer structure can include a channel layer in facing relationship with a strain limiting membrane to create an interconnected pressurizable network and a third layer on the side opposite the channel layer that imparts a desired surface property or other functionality to the device. An exemplary tri-layer structure includes one active layer made of Ecoflex silicone, a sealing PDMS membrane and a gripping layer formed of Ecoflex silicone. The gripping layer can be either a solid layer of Ecoflex silicone or a textured surface. For example, a ridged texture layer can be added to the device for enhanced gripping. This textured surface is more compliant than a solid surface of the same material and provides more traction. The greater traction is used for more secure gripping or for translational movement of the device (e.g., "walking"). Other physical or chemical modifications to the gripping surface could also be applied. For example, anisotropic fabric can be used to functionalize the underside of the robot so that it is capable of sliding in one direction and resists movement in the opposite direction. Another technique is a suction cup system to increase traction or adhesion to a surface. In still other applications, magnets can be used as a magnetic release valve for regulating pressure and bending in bending actuators. In certain embodiments, the actuator device can include a soft sensor element. The soft sensor element can include an eutectic Gallium-Indium (eGaIn) sensor and can be placed on the surface of the actuator device. The sensor element can provide a sensory feedback capabilities to the actuator device. For example, the sensor element can sense the environment (e.g., temperature, physical structure) and trigger the actuator device to operate correspondingly.

Figure 10A:
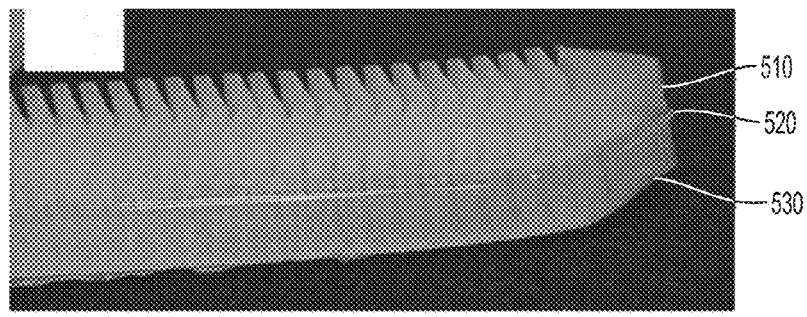
FIGS. 10(a)-10(b) illustrate (a) a multilayer structure having a non-inflatable textured surface used for gripping and an inflatable base capable of actuation; and (b) its actuation according to one or more embodiments.
Figure 10B:
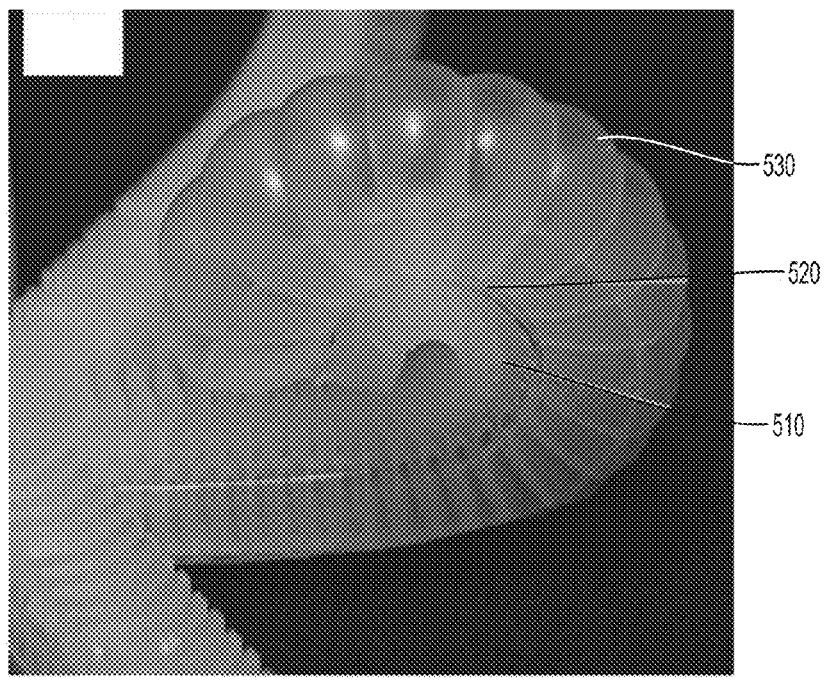

In some embodiments, the soft robotic devices can include surface functionalization that impart added functionality. For example, FIGS. 10(a)-10(b) illustrate a gripper with a textured surface. A set of ridges 510 are formed in Ecoflex silicone on a upper surface of the gripper adjacent to the membrane layer 520. The ridges provide better traction than a flat surface as this texture is more compliant than a solid surface because half of the volume has effectively been removed, and each ridge is pliable and deforms easily. The textured surface can also be angled in the XZ plane or other similar treatment to create directional asymmetry for locomotion in a single direction or enhanced gripping capability. For example, the herring bone texture shown in FIG. 9(a) will slide more easily in the direction defined by the "arrow head" of the herring bone and resist sliding in the opposite direction. The lower surface 530 includes an interconnected channel network that can be actuated to provide gripping. FIG. 10(b) is a photograph illustrating an actuated arm on the gripper, in which the individual chambers that make up the network are visible. The minimum radius of curvature achieved in this design is less than 5 mm.

Figure 11C:
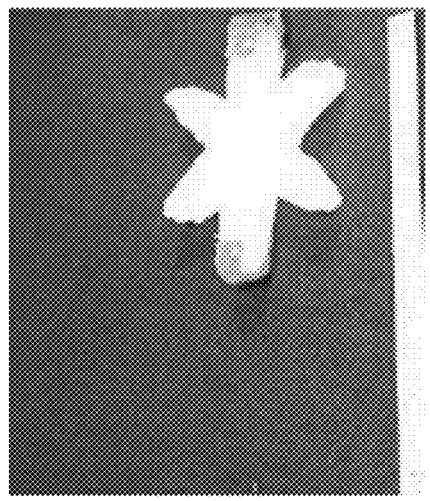
FIGS. 11(a)-11(c) illustrate a starfish assembly that is capable of movement according to one or more embodiments.
Figure 11B:
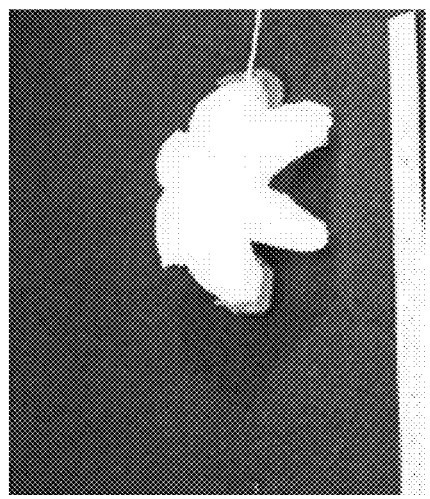
Figure 11A:
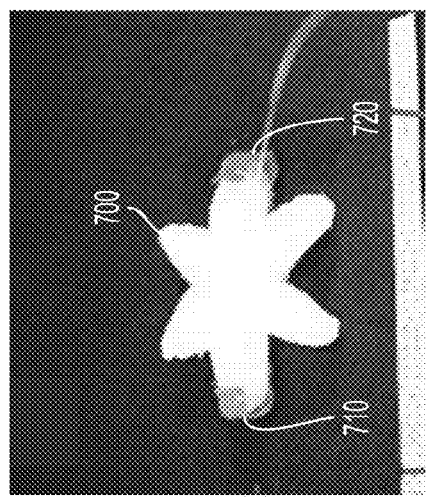

In other embodiments, the actuating device can include a functional material that is located over only a portion of the exposed surfaces of the strain limiting layer. In one embodiment, the functional material can be a high traction material located at the ends of the arms of the structure, like shoes. The functional material provides traction preferentially at the edges, while allowing the main body of the device to slide over the surface. In some embodiment, the functional materials is an anisotropic fabric, so that the fabric oppositions movement in one direction and glides easily in another direction. Such a two dimensional in-plane assembly can create starfish-like walkers as illustrated in FIG. 11. The starfish 700 is a two layer device including an upper active channel layer and a sealing membrane outfitted with anisotropic fabric 710, 720 that allows it to crawl along terrain, as shown in FIG. 11(a). The chambers of the upper layer of the starfish are first pressurized and the starfish bends its arm away from the upper surface, causing the starfish to raise its body from the surface as shown in FIG. 11(b). The starfish walker is then depressurized and flattens out. Due to the anisotropic fabric, fabric 710 digs into the surface and anchors the starfish, and the starfish arm bearing anisotropic fabric 720 slides along the surface, moving the starfish forward as shown in FIG. 11(c). The walker is a simple tool that can traverse complex terrain and is of interest to enhance the mobility of robots.

Figure 12D:
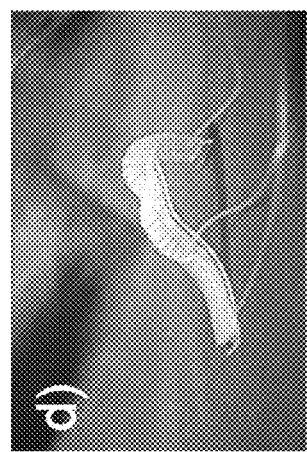

In another embodiment, a linear assembly can be used to form caterpillar-like walkers. FIG. 12 shows a linear device having three independently pressurizable segments. Connecting 3 bending actuators in series creates a 3-segment 801, 802, 803 caterpillar-like walker. The caterpillar walker includes an upper active channel layer, a lower sealing member and, optionally, an anisotropic fabric that covers at least part of the underside of the sealing member to improve traction at the desired locations. Pressurizing each segment in sequence causes a inch-worm locomotion. FIG. 12(a) shows a first segment pressurized so that the segment bends and forms an arch with regard to the surface. FIG. 12(b) then pressurizes the second segment to raise both the first and second segments from the surface. In doing so, the third segment is pulled towards the first segment, as shown in FIG. 12(c). In FIG. 12(d), the first segment is depressurized while the third segment is pressurized, and the depressurized first segment slides forward on the surface. Next, the second segment is depressurized (FIG. 13(e)) and the depressurized second segment slides forward on the surface (FIG. 12(f)). A suction cup system can attach to the lower surface to increase traction.

Figure 13A:
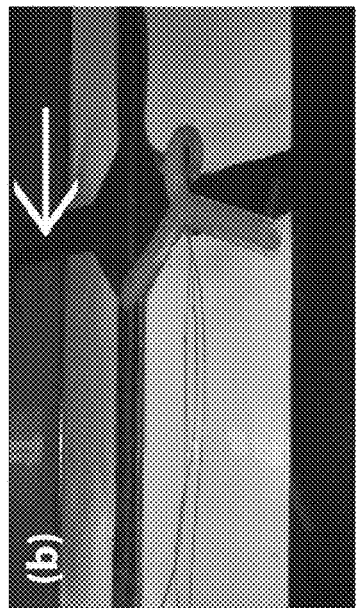
FIGS. 13(a)-13(d) illustrate the locomotion of a soft robotic actuator in water; in which 13(a) is a photograph of the actuator at rest, and 13(b)-13(d) are photographs of the actuator in which one arm moves up and down to pump the device in the direction show by the arrow.
Figure 13B:
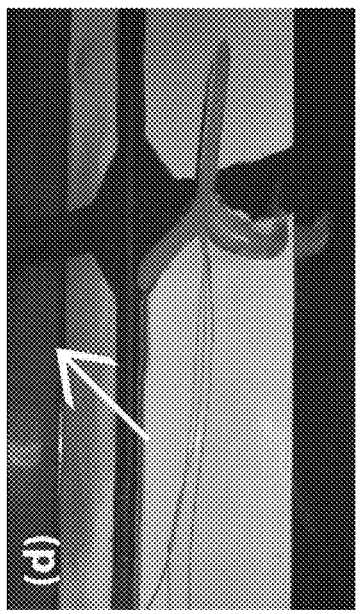
Figure 13C:
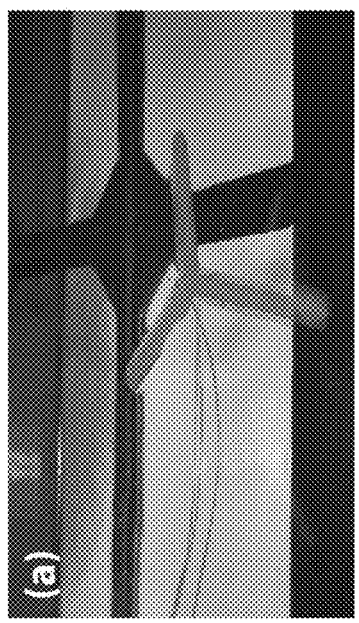
Figure 13D:
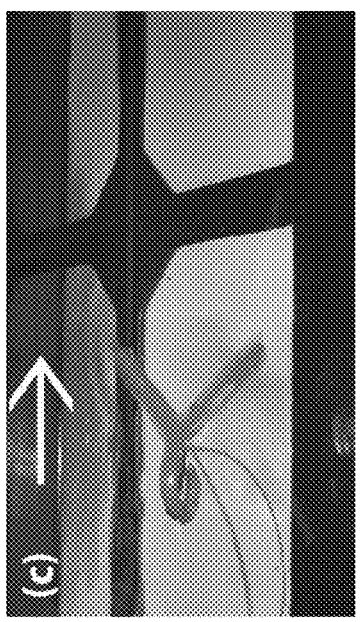

In another embodiment, the device can be configured to permit locomotion on or in water, e.g., "swimming". The same bending motion that can compel the device across a solid surface can also be used to propel the device through water. FIG. 13(a) illustrates a three-legged device in which the legs act like "fins" to swim on the surface of the water. The device includes an upper active multichannel layer and a lower sealing membrane. Repeated bending and relaxing one leg of the device drives it across the water in the opposite direction, as indicated by the arrows shown in FIGS. 13(b)-13(d). It is also possible to provide coordinated movement of two or more legs for more complicated movement.

In certain embodiments, a starfish-like soft robot uses the bending and grasping motion of its legs to generate a propulsive motion. The soft robot can use the propulsive motion to maneuver through or on water. The soft robot can include a soft gripper that is placed onto or attached to a sheet of a deformable elastomer. The soft gripper and the soft elastomeric material can be adhered using adhesive forces between the two, forming a web-like appendage. When actuated, the composite robot can displace fluids, which would allow the jellyfish soft-robot to glide along resulting fluid vortices.

Self-Healing Soft Robots

Figure 14A:
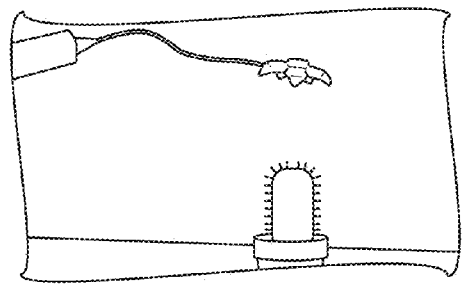
FIGS. 14(a)-14(e) illustrate the effectiveness of the self-sealing layer in accordance with certain embodiments.
Figure 14B:
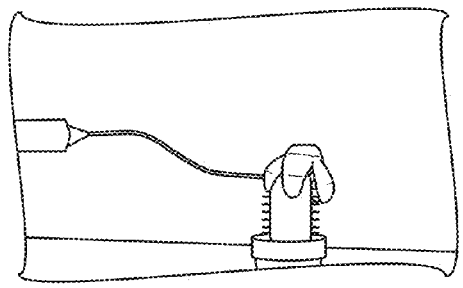
Figure 14C:
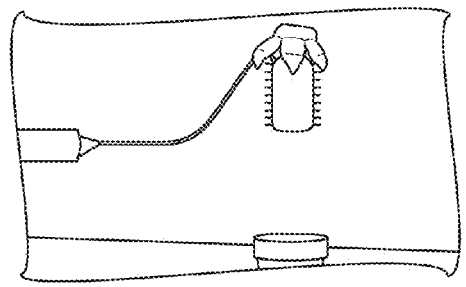
Figure 14D:
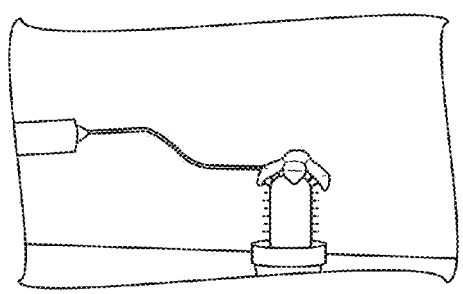
Figure 14E:
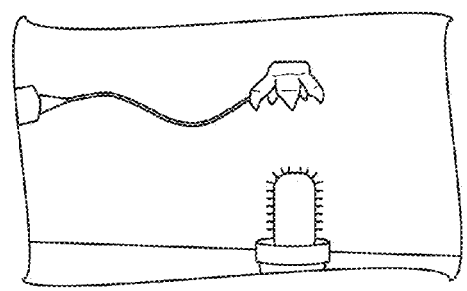

Because soft robots are often built using soft elastomers, soft robots are susceptible to punctures. Soft robots can be punctured during fabrication, or soft robots can be punctured when deployed in the wild, potentially rendering the robots inoperable. To address this issue, in certain embodiments, soft robots can have a layer of ultra-soft material on its surface. This layer of ultra-soft material is called a self-sealing layer. The self-sealing layer can be formed using a material having a lower elastic modulus compared to the underlying structure of the soft robot. The self-sealing layer can be formed using an ultra-soft elastomer, including a silicone elastomer (Ecoflex-0010 and other formulations with Shore Hardnesses below 10). Because the self-sealing layer can be substantially soft, any small to medium punctures can be concealed by the self-sealing layer. FIG. 14 illustrates the effectiveness of the self-sealing layer in accordance with certain embodiments. FIG. 14 shows an experiment in which a soft gripper with a self-sealing layer grips a cactus. In FIGS. 14(a)-14(c), the soft gripper grips a cactus, allowing the needles to create punctures on the soft gripper. If the soft gripper did not have a self-sealing layer to seal around the punctures, the soft gripper would not operate properly because the gripper would have punctures. However, thanks to the self-sealing layer, even after being punctured, the soft gripper is able to operate properly (FIGS. 14(d)-14(e).

Straightening and Twisting Modules

Previous embodiments showed the unpressurized state of the device to be in a relaxed unstrained state. Beyond patterning channel dimensions, the stress state of the actuators can be patterned both mechanically and chemically to define the resting state of the actuators.

In one or more embodiments, one of the surfaces of the device is in a compressed state when the soft robotic device is unpressurized. In one or more embodiment, an external force stretches the elastomer body of the device; the stretched elastomer is then fixed on one side with a material that is not stretched and/or will not shrink to the same degree as the stretched elastomer. When the force is released and the stretched elastomer returns to its original size and shape, the unshrinkable material folds, bends or buckles under the compression force generated by the stretched elastomer as it returns to its original shape. The result is a resting state in which the object is curled.

In comparison to the preceding examples in which pressurization resulted in bending and shortening of the pressurized network, in this embodiment, pressurization leads to extension of the pressurized network. This simple mode of straightening/extension can be used to create extensional devices that can unfurl sheets like sails, jump like frogs, or grab objects like chameleon tongues.

FIG. 15 illustrates the steps used to create a pressurizable network having induced strain in accordance with certain embodiments. In a first step, a substrate 900 containing molded channels (not shown) is stretched from its resting state 910 to its stretched (strained) state 920. A fixing material 930, for example, a sheet of greater stiffness such as paper or fabric, is attached to the stretched molded channels 930. In some embodiments the fixing material can be used as a channel wall; in other embodiments, it can be embedded or attached to a channel well. When the fixing material is attached to the stretched substrate, the fixing material is in its relaxed state.

Upon being attached to the fixing material, the stretched substrate is released. Therefore, the molded channels in the substrate would relax back (i.e., shrink back) to their pre-stretched dimensions. However, as the substrate shrinks back, the fixing material becomes compressed. Therefore, the composite structure would buckle and become coiled in its resting state. This mechanism is useful in creating modules that are coiled in their resting state and are extended under pressurization. Thus, in comparison to the preceding examples in which pressurization resulted in bending and shortening of the pressurized network, in this embodiment, pressurization leads to extension of the pressurized network. This simple mode of straightening/extension can be used to create extensional devices that can unfurl sheets like sails, jump like frogs, or grab objects like chameleon tongues.

Figure 15C:
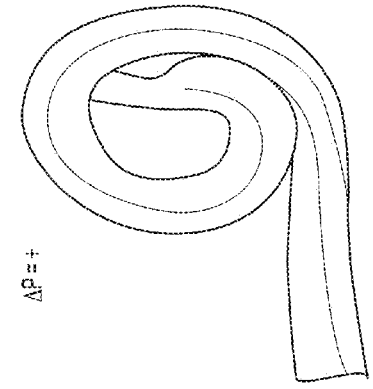
FIGS. 15(a)-15(c) illustrate (a) a method of making a gripping device by prestretching a low elastic modulus elastomer and fixing it to a higher elastic modulus material to retain the stress state of the soft rubber, when the strain is released, the stress state retains and the high elastic modulus material buckles according to one or more embodiments; (b) a reverse bending actuator unpressurized; and (c) a reverse bending actuator pressurized.
Figure 15A:
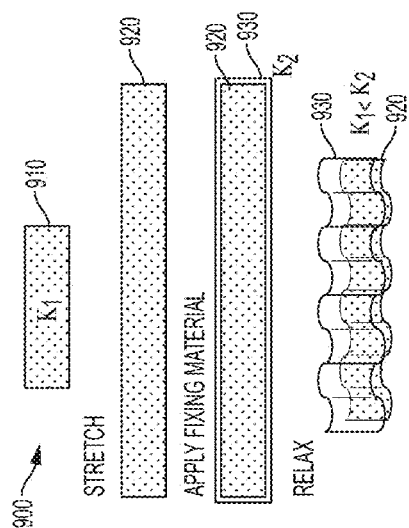
Figure 15B:
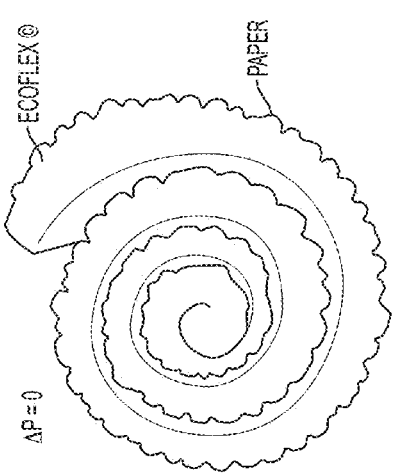

In certain embodiments, the composite soft robot is formed from Ecoflex silicone 910 and a paper fixing layer 930, as shown in FIG. 15(a). Because the stretched Ecoflex silicone 910 has a material compliance ("$\kappa_1$") that is smaller than that of the paper ("$\kappa_2$"), the composite structure is curled in its resting state (FIG. 15(b)). Upon pressurization, the Ecoflex silicone layer is stretched and the layer flattens out (extends) as shown in FIG. 15(c).

In certain embodiments, the stress state of the actuator can be patterned by the embedding of structures into the substrate. Combination of substrates (to provide controlled strain in some directions) with fiber reinforcements such as cloth and paper (to limit the strain in other directions) provides a versatile method for obtaining polymeric composite structures with highly non-linear, anisotropic responses of strain to stress.

Figure 16:
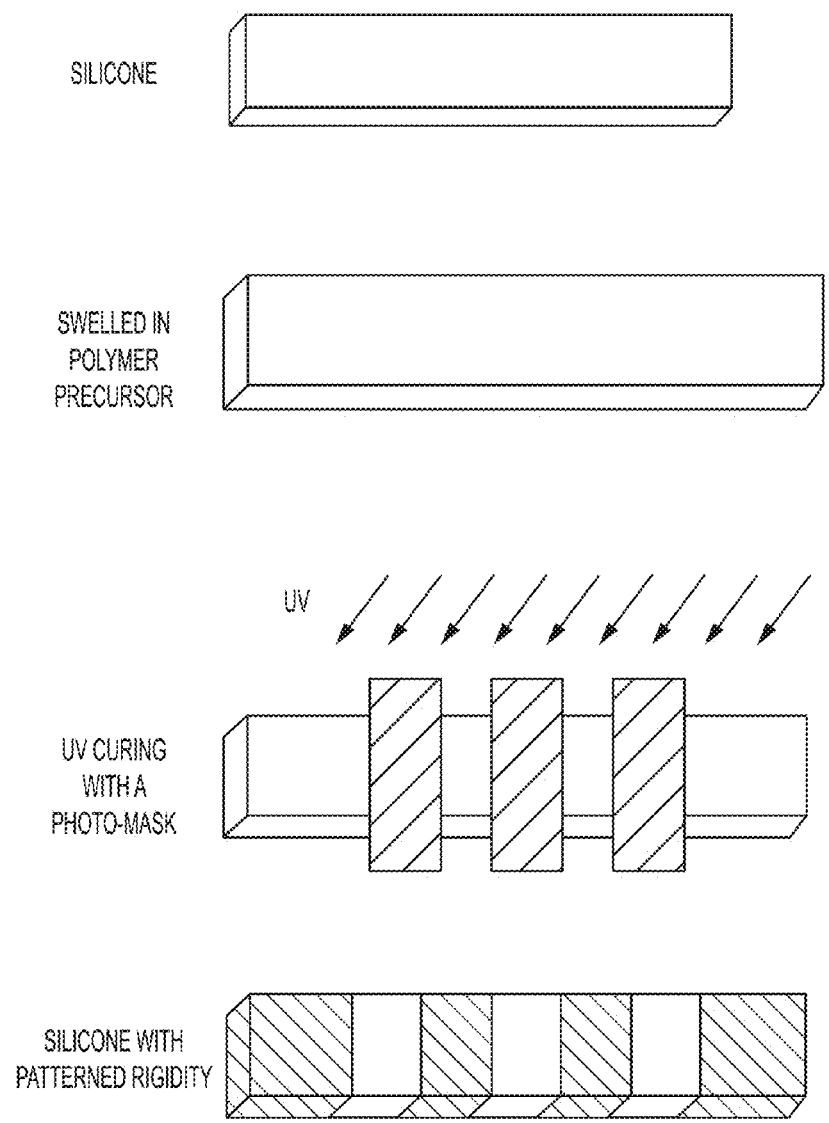
FIG. 16 illustrates chemical patterning of a silicone rubber strip that selectively patterns strained regions so they remain under stress after the strain is removed. This technique can be used to prescribe deformations with and without pressurization.

FIG. 16 shows a method of modifying the stress state of an actuator in accordance with certain embodiments. This method could be used by itself or in combination with mechanical patterning to create more intricate straightening actuators. An elastomeric flexible polymer can be impregnated with a polymer precursor solution, which is then cured in a predetermined pattern to form a stiffer polymer. The result is a composite structure with patterns of two-dimensional stiffness. In FIG. 16, a silicone membrane that serves as the sealing member for a pressurizable device is treated as follows. The silicone membrane is soaked in a solution containing a curable polymer precursor. The polymer precursor is absorbed by the silicone strip as the strip swells in the solution. Next the polymer precursor infused strips are cured, for example using UV to introduce a pattern of cured and uncured regions in the grip. The cured regions become more rigid than the uncured regions and the unreacted polymer precursor can be rinsed away to provide a silicone strip with pattered rigidity. This strip can be used as the fixing material for preparing an actuator that is compressed in its resting state and is expanded when pressurized.

Figure 17:
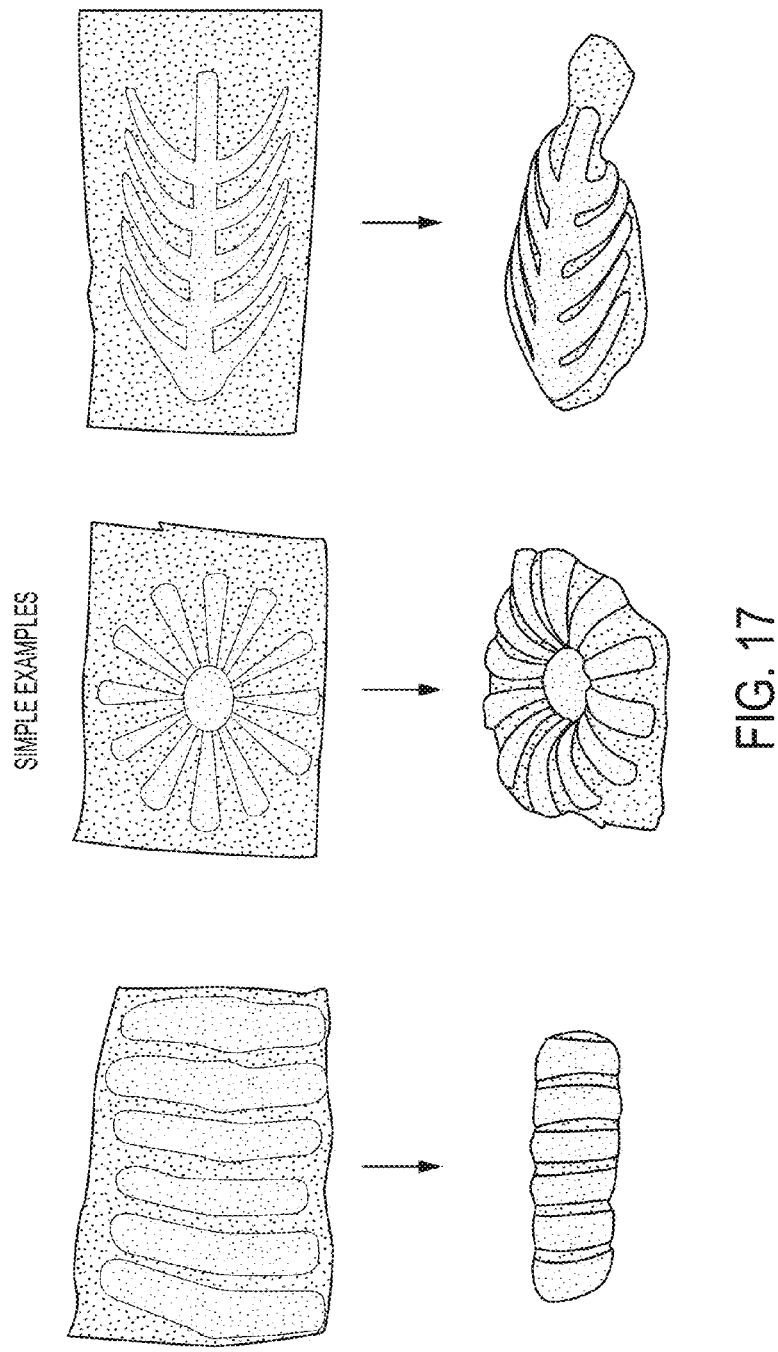
FIG. 17 illustrates the chemical patterning of an Ecoflex silicone membrane and demonstrates the versatility of the process to provide complex patterns.
Figure 17:
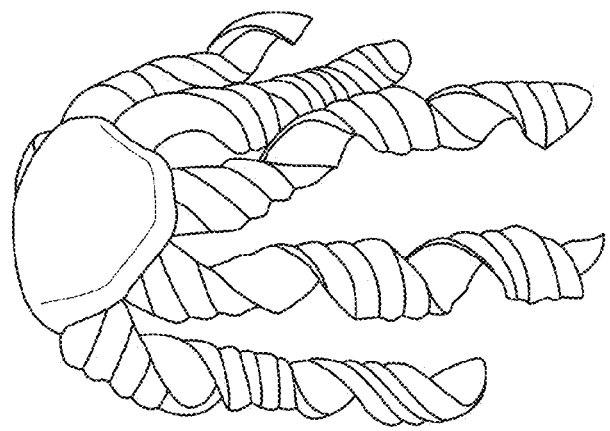
Figure 17:
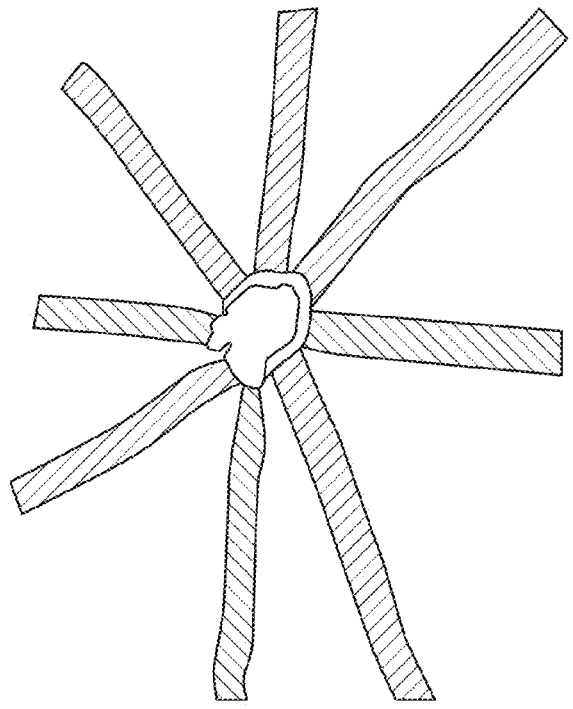

FIG. 17 shows a variety of complex patterns that can be introduced into a sealing membrane layer using the patterning method described above. The chemical patterning of the silicone rubber strip selectively patterns strained regions so they remain under stress after the strain is removed. This technique can be used to prescribe deformations with and without pressurization. Using the concept described above for molding channels at an angle to create twisting movement, an alternative process can be used to create diagonal regions of higher stiffness in order to fabricate an actuator that curl when relaxed and twist along its longitudinal axis when inflated. The patterned sealing members can be used with flexible channel members to prepare pressurized channels as described herein.

Complex Robots

Figure 18:
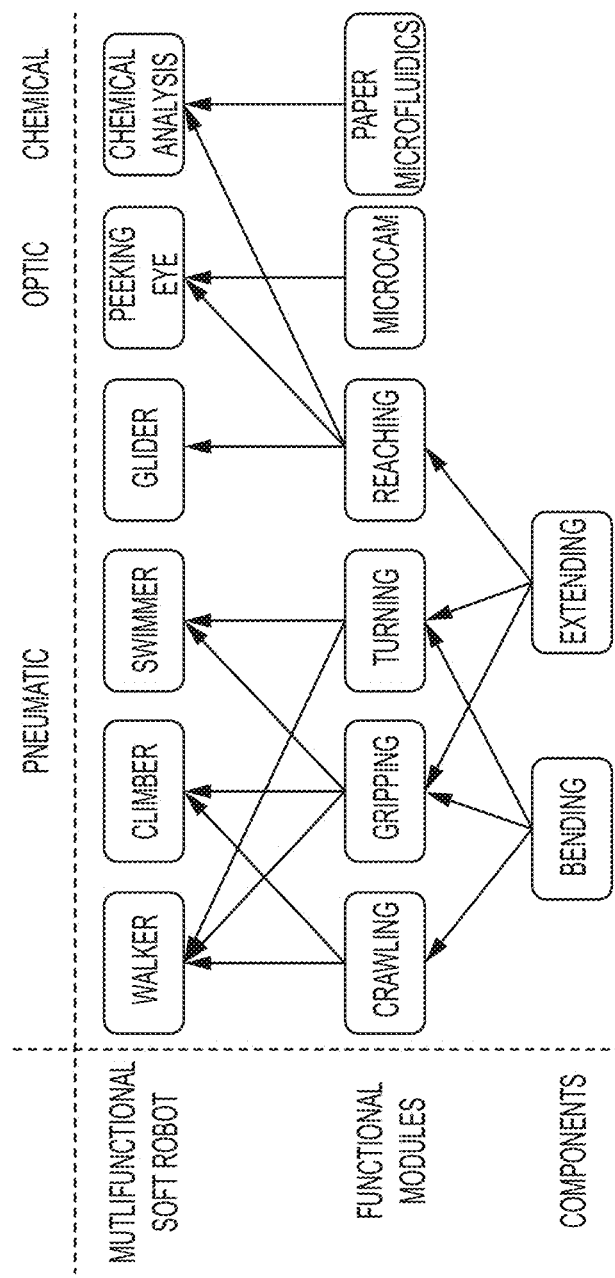
FIG. 18 is a diagram of the complex motions that can be introduced into a soft robotic based on the fundamental movements of bending and extension.

Some of the versatility of soft robots lies in its ability to build complex motions and function by combining modes of pneumatic actuation. Modes of pneumatic actuation that provide useful capabilities to soft robots include bending and extending. Simple models can be developed that enable these types of actuation. Functional modules are assembled to provide multifunctional soft robot prototypes in a strategy similar to that shown in FIG. 18. Using an approach that focuses on building up from basic capabilities, it is possible to correlate actuation modes and functionalities in terms of application, stability, and ease of control; and build components that can be used in a modular fashion to generate a large number of capabilities.

In accordance with certain embodiments, there are two types of pneumatic "components" that are capable of bending and extending actuations respectively. Various functional "modules" can use these pneumatic components to perform locomotive or manipulative tasks. These pneumatic functional modules, in conjunction with other modules such as a microcamera and paper diagnostic chips, can enable various multifunctional soft robots.

From the fundamental modules described herein, it is possible to combine functionalities with each other and with existing robotics to obtain highly complex motions. For example, the soft actuators described herein can be combined with conventional McKibben muscle-like devices to incorporate a contraction and extension motion with a bending and gripping motion. In other embodiments, the soft actuators described herein can be combined with other actuators, such as tubular devices.

Figure 19C:
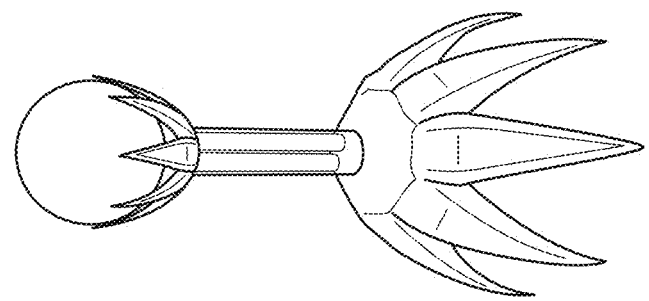
FIG. 19 A-C is an illustration of a land-based soft robot having a combination of walking and gripping capabilities.
Figure 19B:
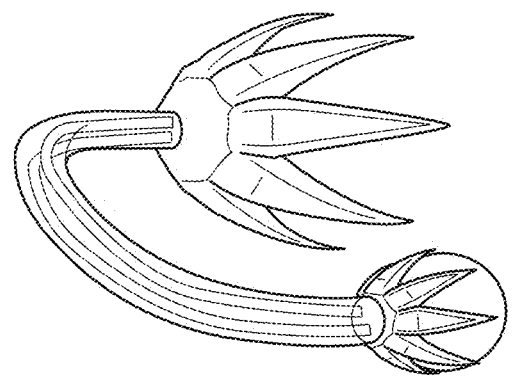
Figure 19A:
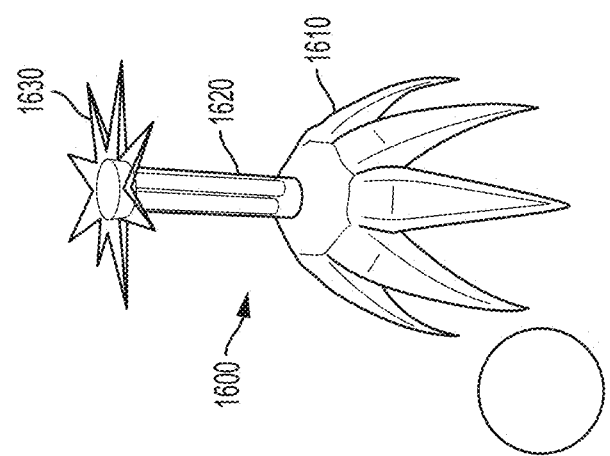

In certain embodiments, the walking and gripping capabilities can be combined to create a gripping robot that is capable of movement, e.g., a land based robot 1600 capable of picking up objects. FIG. 19(*a*) shows a starfish walker 1610 (prepared as generally described herein) having a tentacle module 1620 mounted on its top surface with a subsequent, smaller, starfish gripper 1630 (prepared as generally described herein) attached to the tentacle, creating a rudimentary robot. The tentacle used in the crab robot is used for bending modes and is capable of bending in 360 degrees. The tentacle can be rotated and bent to position the upper smaller gripper to pick up an object (FIG. 19(*b*)) and then pick up the object and use the starfish walker to move the object from the original location (FIG. 19(*c*)).

An assembly of three bending actuators in a cylindrical arrangement forms a simple "tentacle" module able to explore three-dimensional space. As shown in FIG. 20, a cylindrical mold 1700 with three channels 1710 running the length of the channel is used to create the channel network in the mold replica. The center channel 1720 of the mold can be filled with a strain limiting material to enhance bending degree on actuation or left empty for further functionalization. The tentacle can be rotated and bent into positions in a 360° area of rotation around the central axis defined by the tentacle.

The tentacle or trunk module can be adapted to form a multi-segmented soft-robot that emulates snake-like locomotion. Though there are several slithering techniques that snakes have adapted for locomotion, FIG. 22 illustrates motion based on that of the *Crotalus cerastes*, a Sidewinder, which is capable of moving over obstacles in its path. This method of locomotion is somewhat intuitive as the Sidewinder's body reaches, grabs, and pulls itself along through contact in only a few locations. FIGS. 22(*a*)-22(*d*) demonstrates such locomotion using two, first generation trunk actuator in series. This particular design consists of two trunk actuators linked in series. The images on the left is an illustration of the sidewinder robot and shows the two trunk actuators linked in series, forming a primitive Sidewinder soft-robot capable of locomotion through sandy terrain.

In other embodiments, a starfish walker architecture includes individually addressable arms, each having three degrees of freedom. The starfish module can be adapted to be very stable by deflating the robot's arms, lowering its center of gravity, or highly mobile by inflating the robot's arms, raising its center of gravity. Due to this robots symmetry and unlimited degrees of freedom, it can, in principle, flip itself over to right itself, or operate upside down. The starfish-like robot includes pneumatically actuated elastomeric functional modules (arms capable of 3D actuation). The features of this body plan include i) elastomeric arm modules that have virtually infinite degrees of freedom, maximizing environmental adaptability; ii) pneumatic actuation that can generate a wide range of manipulative and locomotive abilities; iii) hierarchical structures that use modular approaches are adaptable and scalable; and iv) a simple body plan that permits reuse of modules. The ability to move each arm individually makes the starfish capable of walking. This design enables the starfish to incline steep grades greater than 20° and surpass steps at least 10% of the robot's length.

Figure 23A:
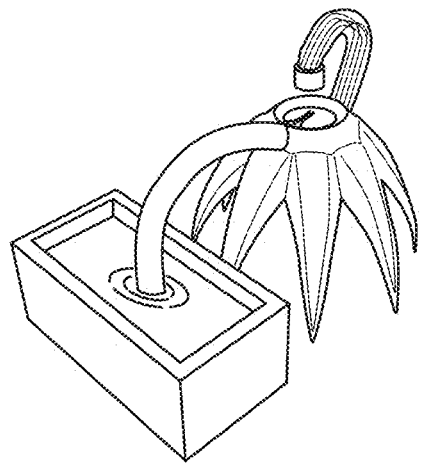
FIGS. 23(a)-23(b) are (a) a schematic illustrating a conceptual soft robot, capable of multiple tasks—surveillance, liquid delivery, chemical analysis, and imaging; and (b) a zoomed-in drawing of the robotic system shown in (a).
Figure 23B:
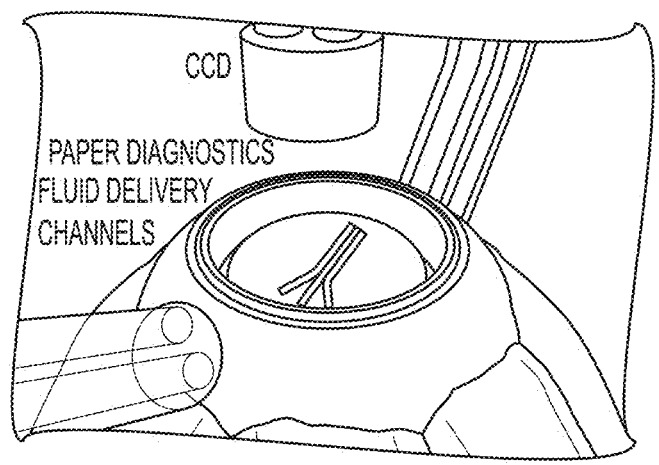

FIG. 23 shows a further embodiment of a multifunctional soft robot that can crawl over rough terrain to reach a spot from which it will collect a chemical sample. The collected sample could then be directly transferred to a device, such as a disposable paper-based diagnostic systems, to perform a chemical separation and image the colorimetric result via the attached image sensor such as a charge coupled device (CCD). Chemical analysis is performed by imaging the colorimetric data obtained by a paper-microfluidic device. Performing this type of task in an unpredictable and hostile environment (e.g., slanted or slippery terrain, target in a narrow slit or buried in rubble) would be difficult or impossible for conventional robots with limited degrees of freedom and rigid body parts.

Figure 24A:
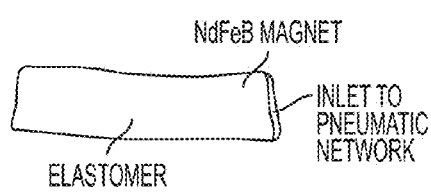
FIGS. 24(a)-24(c) show (a) a functional module ("finger") with a magnet at one end; (b) the functional module of (a) in a different perspective, showing the magnet; and (c) two functional modules that are joined to form a contiguous pneumatic network.
Figure 24B:
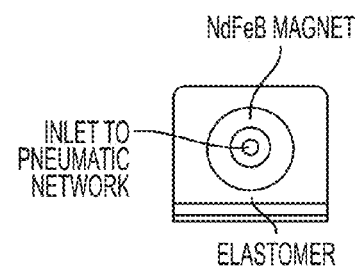
Figure 24C:
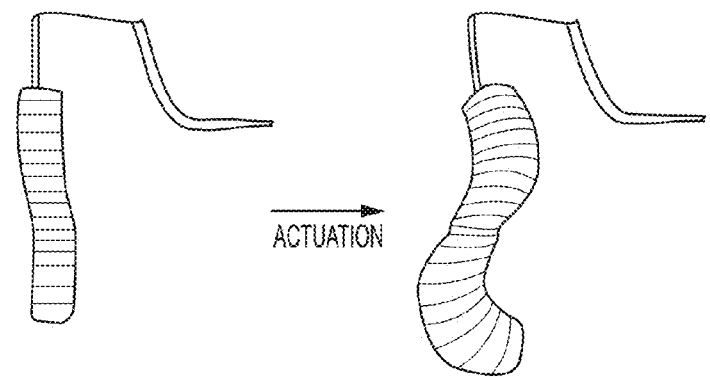
Figure 25A:
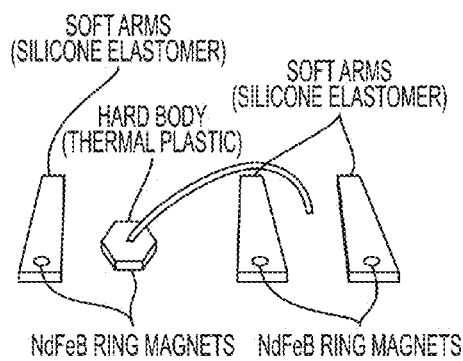
FIGS. 25(a)-25(e) show (a) a plurality of functional modules with a magnet at one end, and a connector for coupling the plurality of functional modules; (b) the assembled functional modules using the connector; and (c-e) the motion of the assembled functional modules.
Figure 25C:
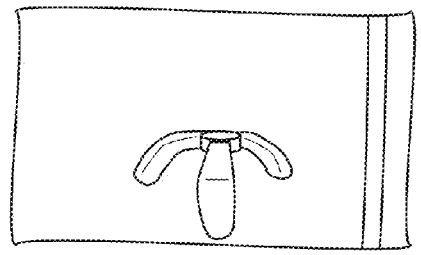
Figure 25D:
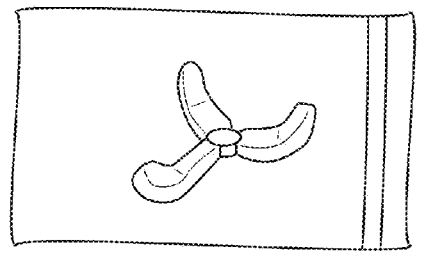
Figure 25B:
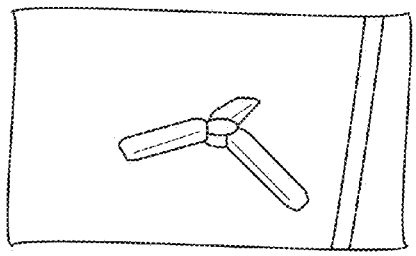
Figure 25E:
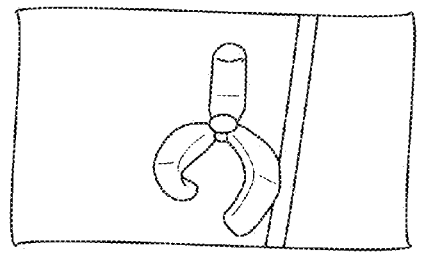

Complex soft robots can be assembled from individual functional modules using magnets. FIG. 24 illustrates assembling a complex soft robot using magnets in accordance with certain embodiments. A functional module can be formed using an elastomer such as Ecoflex, and is of dimension 4 cm×1 cm×1 cm. This functional module can have a magnet at one end, as illustrated in FIG. 24(*a*). The magnet can be a neodymium (NdFeB) magnet, but can also be any other types of magnets. In some embodiments, as shown in FIG. 24(*b*), the magnet is shaped as a ring so that the hollow region of the ring can accommodate a fluid inlet into the pressurizable network of the functional module. The ring can be of any geometric shape, including a triangle, a rectangle, a pentagon, a hexagon, any polygons, or a circle. The center of the ring can be aligned with the fluid inlet. In certain embodiments, the magnet can be placed inside of the functional module, or the magnet can form a part of a pneumatic seal of the functional module.

FIG. 24(*c*) illustrates that, when two functional modules having magnets of opposite polarities come close, the two functional modules would join to form a contiguous pneumatic network. The strength of the attraction between the two functional modules can be controlled by controlling the strength of the magnets. When the magnetic attraction between the two functional modules is strong enough, the two functional modules would be tightly joined. The tight joining of the two modules can substantially prevent fluid leaks. Therefore, fluid passing through the pneumatic network of one functional module can be passed onto the pneumatic network of the other functional module without any substantial fluid leaks. Using this mechanism, the contiguous pneumatic network can be actuated from a single pressurizing inlet connected to one of the functional modules as illustrated in the right picture of FIG. 24(*c*). The motion of the assembled soft robot can be controlled by controlling the orientation of the functional modules. The orientation of the functional modules can be controlled by individually rotating the functional modules.

In certain embodiments, three or more functional modules with magnets can be coupled at a single pneumatic junction with the aide of a connector. FIG. 25 illustrates assembling multiple functional modules in accordance with certain embodiments. As shown in FIG. 25(*a*), the connector can have a plurality of fluidic inputs that are in fluid communication with one another. As illustrated in FIG. 25(*b*), when functional modules attach to one of these fluidic inputs, the connector can pneumatically couple these functional modules. Therefore, the assembled robot can be controlled from a single inlet as illustrated in FIGS. 25(*c*)-25(*e*). In some embodiments, the connector can be made from a hard material that attracts magnets. Such hard materials can include iron or a thermoplastic. A thermoplastic can include acrylonitrile butadiene styrene (ABS). In certain embodiments, the connector can be formed using a paraffin wax. In other embodiments, the connector can be formed from a soft robot having a plurality of legs, each leg having a magnet as illustrated in FIG. 24(b).

Camouflage

In one or more embodiments, soft robotics can be further enhanced by surface features that either camouflage or reveal a robot in its environment. The same molding fabrication techniques used to create pneumatic channels, can also be used to create fluid fillable chambers. These chambers can be filled with fluids that either camouflages a soft robotic so that it blends in with its background or stands out against the background. The fluid filled chambers can be incorporated into the soft robotics in addition to the channels used for motion. In certain embodiments, the fluid filled chambers are disposed within a material that has a higher elastic modulus compared to the modulus of the elastic material forming the pneumatic network.

Figure 26A:
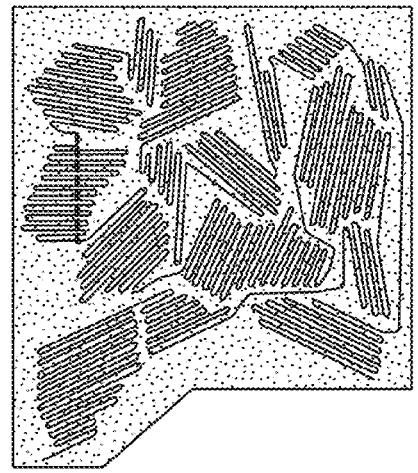
FIGS. 26(a)-26(c) are schematic illustrations of an Ecoflex silicone sheet in which fluid fillable channels have been molded.
Figure 26B:
Figure 26C:
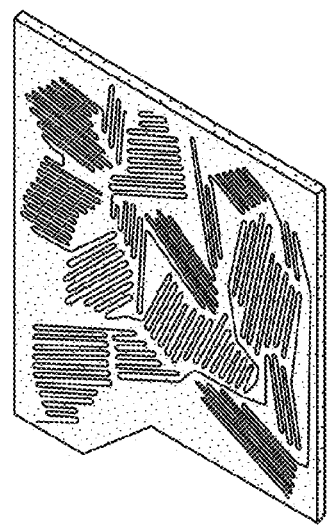
Figure 27:
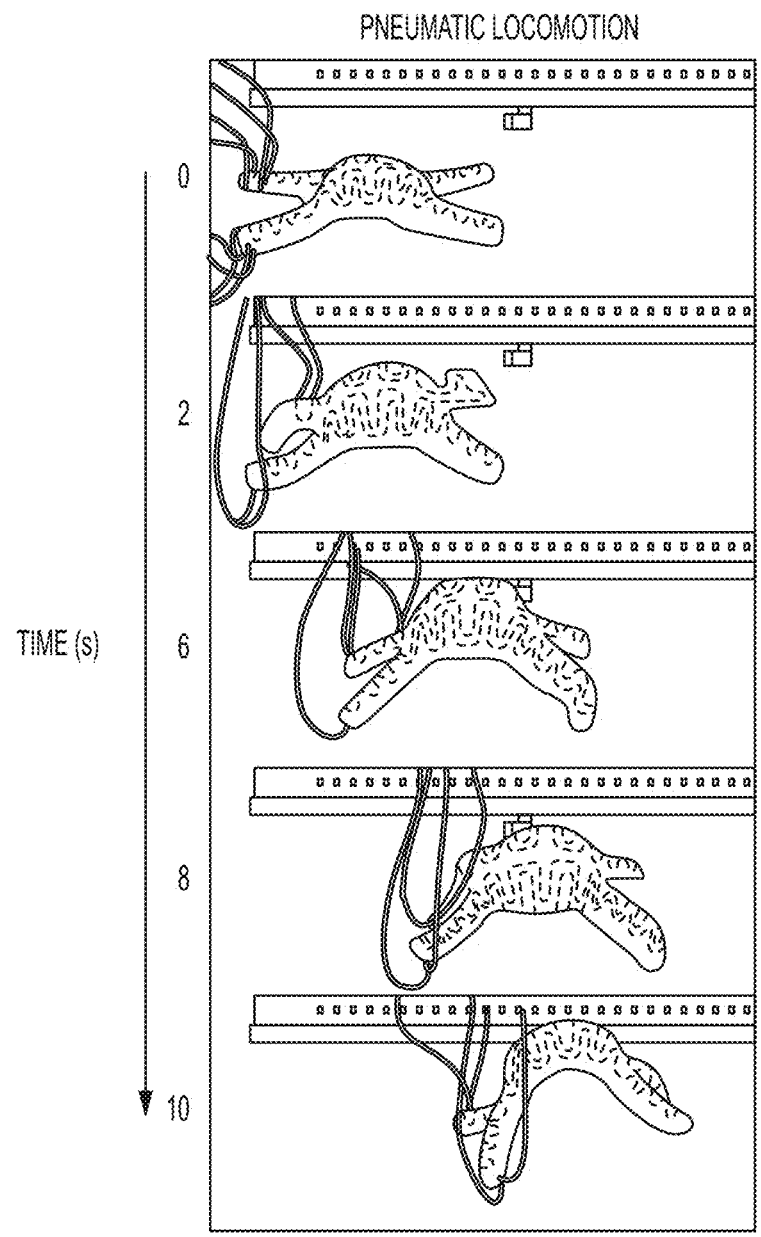
FIG. 27 is a series of photographs showing a patterned soft robotic moving by successive inflation and deflation of the pneumatic chambers, while the camouflage chambers are intact.

FIG. 26 is a schematic illustration of an Ecoflex silicone sheet in which channels have been molded. FIG. 26(a) is a plan view showing the closely spaced channels running across the surface of the sheet. FIG. 26(b) is a cross section across the dashed line in FIG. 26(a), showing the dimensions and spacing of the channels. FIG. 26(c) shows similar patterning in a PDMS sheet of much thinner dimension, demonstrating that it is possible to incorporate camouflaging channels into the thin layer used as the strain limited layer. FIG. 27 is a series of photographs showing a patterned star soft robotic moving by successive inflation and deflation of the pneumatic chambers, while the camouflage chambers are intact.

Figure 28:
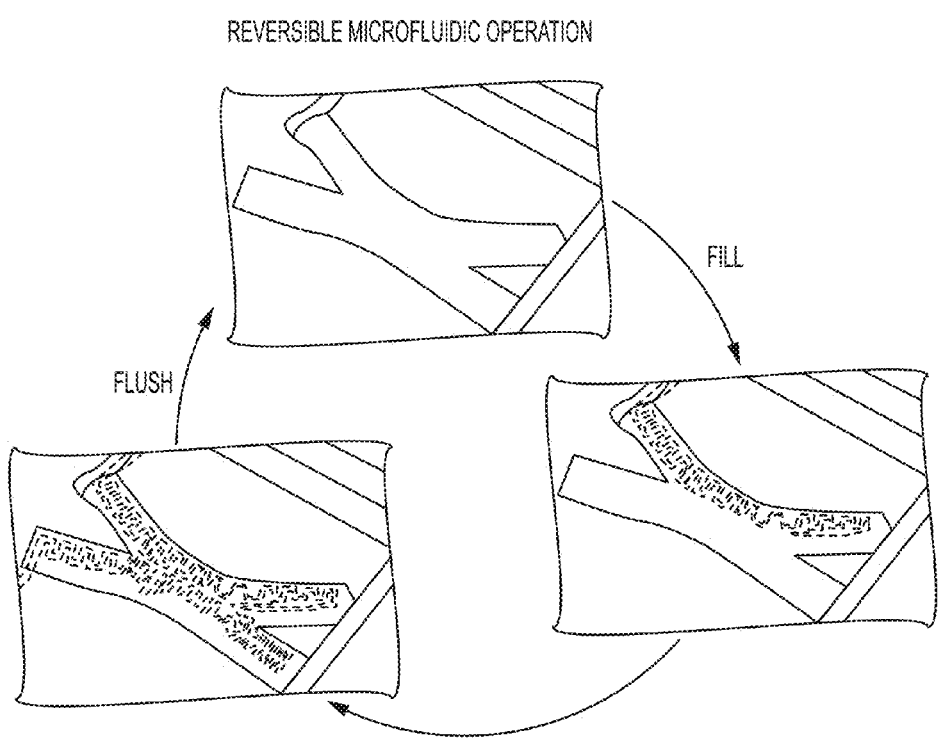
FIG. 28 is a photograph of a soft robot including fluid fillable chambers for camouflage and pneumatic channels for motion, in which the surface channels have been filled with colored fluid to change the surface marking of the device.

FIG. 28 is a photograph of a soft robot including fluid fillable chambers for camouflage and pneumatic channels for motion, in which the surface channels have been filled with colored fluid to change the surface marking of the device. The colored fluid can include a pigment. The color fluid can also be semi-transparent. The process is reversible, as is indicated by FIG. 28. The fluid fillable channels are first filled with colored fluid; the process can occur in sections or over the entire surface of the device. The device can be purged of camouflaging fluid to return the soft robotic to its original state. In other embodiments, it may be desirable to increase visibility of a robot in the environment. In such cases, the fluid can either provide a contrast with the environment or it can fluoresce or phosphoresce to provide additional visibility. The fluorescence liquid can be provided by dissolving bis(2,4,6-trichlorophenyl)oxalate (TCPO) and a fluorescence dye (e.g., 9.110-bis(phenylethynyl)-anthracene for green) in diethyl phthalate and by adding a tert-butanol solution of hydrogen peroxide. A catalytic amount of sodium salicylate can also be added to the fluorescence liquid to accelerate the reaction between hydrogen peroxide and TCPO. This reaction can generate a reactive intermediate 1,2-dioxetanedione that, upon decomposition, excites the dye causing fluorescence.

Figure 29:
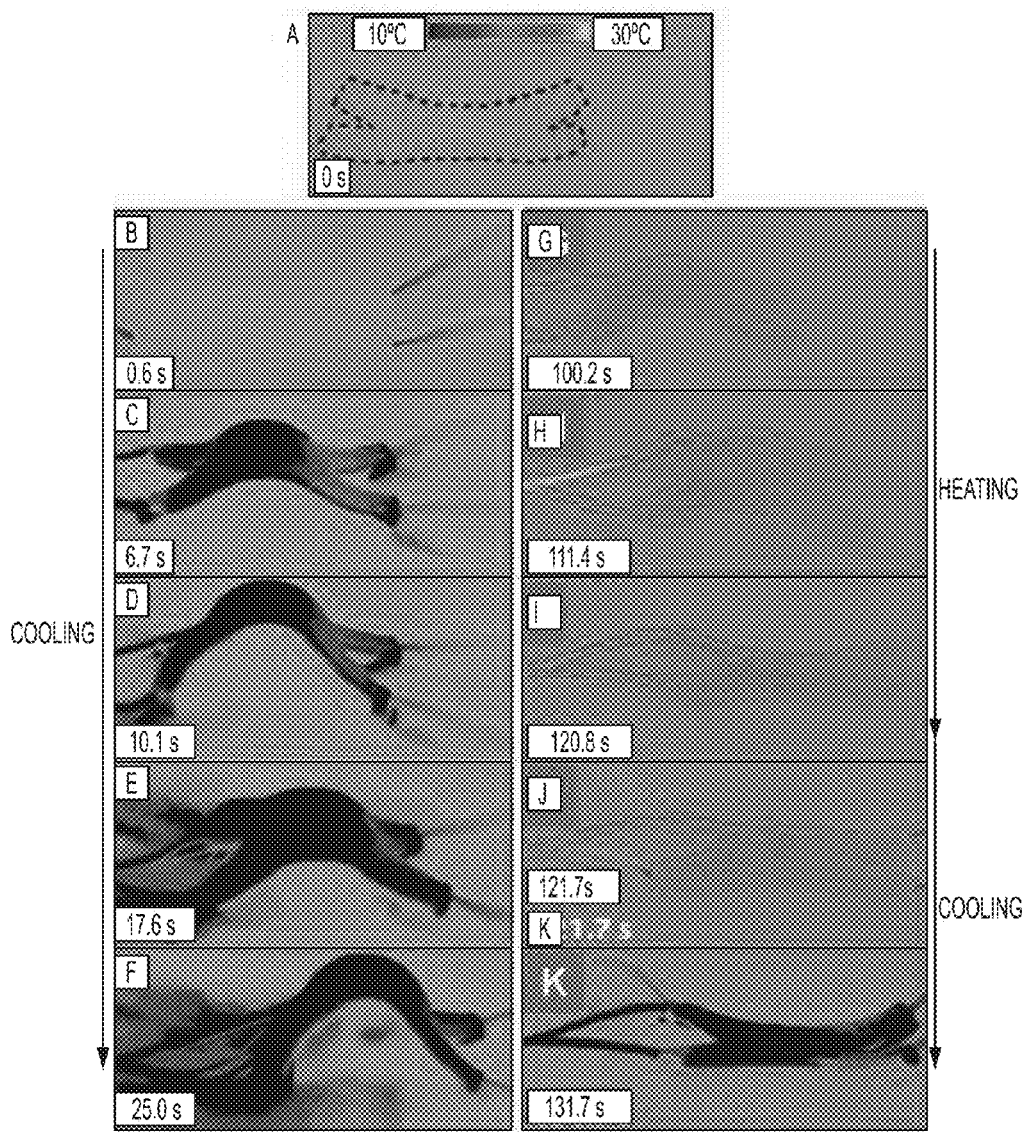
FIG. 29 illustrates a soft robot whose surface temperature changes in accordance with input gas temperature in one or more embodiments.

In certain embodiments, the fluid fillable chamber can accommodate hot and/or cold gases to change the surface temperature of robots. The surface temperature change can provide a signature in the infra-red (IR) spectrum. FIG. 29 illustrates a soft robot whose surface temperature changes in accordance with the input gas temperature in one or more embodiments. As illustrated in FIG. 29(a), the soft robot is initially at a room temperature and is camouflaged in the IR spectrum. As illustrated in FIGS. 29(b)-29(f), the soft robot can be cooled to less than 10 degrees Celsius in 25 seconds by providing cold gas in the fluid fillable chamber of the soft robot. In certain embodiments, the cold gas can be provided to the fluid fillable chambers by decompressing an aerosol canister used to dust computer keyboards. Alternatively, as illustrated in FIGS. 29(g)-29(k), the soft robot can be heated to about 30 degrees Celsius in 30 seconds by providing heated gas in the fluid fillable chamber of the soft robot. In certain embodiments, the heated gas can be provided to the fluid fillable chambers by passing nitrogen gas over resistive heating elements. The surface temperature change of the soft robots provides a clear IR signature that can be captured with IR cameras.

The fluid fillable chambers provide a simple way to mimic the complex function of cephalopod skin. It also enables soft robots to become more or less noticeable depending on their intended application and environment. Unlike electronic displays, power isn't needed to maintain coloration/pattern. The ability to change surface coloring could enhance the ability of robots to integrate with society.

EXAMPLE EMBODIMENTS

Soft robots are promising for applications that require robotic interactions with delicate objects, and where the use of feedback sensors is too cumbersome, difficult, or costly to install. The flexible pneumatic manipulators, upon gripping, do not concentrate stresses in the way that rigid manipulators do—the soft pneumatically actuated interface distributes the force over the entire area of contact. Patterning topography into the gripping surface created alternating gaps of air and Ecoflex silicone, increased the compliance of the surface and improved their ability to grip fragile objects. Because the pneumatic networks do not use articulated joints the soft grippers can manipulate many irregularly shaped objects. Even when actuated by a single inlet, fingers with pneumatic networks can have different local curvatures along their length. Therefore, edges or protrusions on an object do not interfere with the actuation or gripping, and the compliant gripping surface can closely follow an irregular surface. Distributed pneumatic networks also increase the flexibility of actuation. If a part of the network is prevented from expanding (actuating), the remaining part of the network will still be able to function properly. Pneumatic networks do not require high power to deliver versatile function. For the devices described here, a consumption of about 4 W per stroke is estimated. Continuous feeding of power to maintain an actuated (or gripped) state is not necessary. When a simple valve is closed, the device (gripper) remains in the inflated/closed state.

The soft materials described here are useful for situations that require greater force, or compressible robotic modules, or density (of the robot) matched to that of an aqueous environment (for example, for applications underwater).

The devices disclosed herein can serve as pressurizable components that are capable of bending and extending. These capabilities have been incorporated into devices with higher functionalities of locomotion and manipulation, such as crawling, gripping, turning, reaching, as well as more complex functions such as walking and swimming.

Example 1

PDMS (Dow Corning Sylgard 184) and Ecoflex silicone 00-30 (Smooth-On) were selected because they are soft, flexible elastomers; both are easy to work with. PDMS is transparent, harder (specified Shore A hardness of 50) and stretches less than Ecoflex silicone and is therefore more suitable for parts which do not expand significantly, or that require transparency.

Ecoflex silicone is translucent, highly flexible and soft (specified hardness below the Shore A scale), and therefore suitable for components with larger strains/displacements in actuation.

The three-dimensional molds were designed using computer-aided design (CAD; Alibre, Inc.) and generated using a three-dimensional (3D) printer (StrataSys Dimension Elite) with acrylonitrile butadiene styrene (ABS) plastic. 3D printing is a rapid, low-cost process, and well suited for rapid prototyping.

Replicating channels of the Pneu-nets using the three-dimensional mold can be performed using a prepolymer. A prepolymer includes a monomer or monomers at an intermediate molecular weight state. The channels of the Pneu-nets can be formed using soft-lithography. Soft-lithography includes casting a prepolymer of elastomer (e.g., silicone, urea, acrylamide, gelatin) in the 3D printed mold, partially curing the molded prepolymer by a short (15 minute) baking step, and removing the resulting open-channel structure from the mold. The channels were assembled from two parts—a flat membrane, typically 1 mm in thickness was used to close a channel formed in a second part. To fabricate the final closed-channel devices, the partially cured, molded open-channel piece was bonded to a flat membrane by manually applying a thin coat of uncured prepolymer (of the same material as the membrane) to serve as an adhesive. The parts were bonded and the entire structure cured fully by baking it at 60° C. for 3 h.

To enable pneumatic activation, compressed air (pressure 1-4 psi) was delivered through polyethylene tubing inserted and glued into the channel network post curing. When pressurized, channels will expand in the region that is the most flexible. In homogeneous elastomers, this region would be where the channel is closest to the surface.

Example 2

To demonstrate a soft structure with immediate potential for use, we built starfish like grippers. The active parts of these structures are fully soft; PDMS and Ecoflex silicone are the only materials used for fabrication; the polyethylene tubing and nylon string used for lifting are not. The tri-layer structure used here consisted of one active layer made of Ecoflex silicone, a closing PDMS membrane and a gripping layer formed of Ecoflex silicone. The gripping layer was either a solid layer of Ecoflex silicone or a textured surface shown in FIG. 10. Each of the networks for actuating the individual arms used a common inlet; polyethylene tubing inserted in the inlet delivered air for actuation. The actuated arms of the gripper curled about axes perpendicular to the longitudinal axes of the arms. When we applied pressure to the interconnected channels in the top active layer of the device, the arms curled downward; the actuated response by the effective curling of the six arms was capable of gripping objects such as an uncooked egg and an anesthetized mouse (FIG. 9). The soft gripper did not damage/harm the egg or the mouse during manipulation.

By picking up smooth polypropylene spheres with increasing diameter and weight, we tested the loading capacity of the grippers; we used spheres with diameters of 2.5, 5, 7.5, and 10 cm and incrementally loaded them with free weights until the gripper failed to lift and maintain a grip on the sphere. This test showed that the grippers described here were able to maintain a grip on spheres with diameters up to 10 cm and loads up to 300 grams. Adding a modified surface such as that depicted in FIG. 10(a) to both grippers improved their ability to lift larger and heavier spheres. The supplemental information includes tabulated values for the maximum loads attained.

Table 2 shows loading capacity of the starfish grippers when gripping smooth polypropylene (PP) spheres. Four three-layer grippers (Ecoflex-PDMS-Ecoflex) picked up polypropylene spheres: two grippers were with an overall diameter of 9 cm (twice the length of an individual arm) when laying flat and two grippers were with an overall diameter of 14 cm. We examined two types of gripping surfaces based on Ecoflex silicone: a smooth surface and a textured surface (texture shown in FIG. 10(a)). All grippers had a thickness of 1 cm. Missing data points are combinations where the gripper was not able to pick up or maintain the grip on the object.

| Maximum loading weight sustained by grippers | | | | |
|---|---|---|---|---|
| Diameter of PP spheres (cm) | 9 cm diameter gripper, smooth surface | 9 cm diameter gripper, textured surface | 14 cm diameter gripper, smooth surface | 14 cm diameter gripper, textured surface |
| 2.5 | 230 g | 80 g | 100 g | 300 g |
| 5 | — | 120 g | 300 g | 300 g |
| 7.5 | — | 90 g | 300 g | 300 g |
| 10 | — | — | 100 g | 300 g |

Example 3

To build stress into actuators a prestretched Ecoflex silicone mold containing the pneumatic network was put into contact with materials with a higher stiffness soaked in uncured elastomer. When the elastomer was cured the prestretched Ecoflex silicone and the material were welded together. Finally, when the stretching force is removed, the stress is built into the device.

It will be appreciated that while a particular sequence of steps has been shown and described for purposes of explanation, the sequence may be varied in certain respects, or the steps may be combined, while still obtaining the desired configuration. Additionally, modifications to the disclosed embodiment and the invention as claimed are possible and within the scope of this disclosed invention.

What is claimed is:

1. A soft body robotic device, comprising:
   a flexible molded body having a plurality of interconnected chambers disposed within the molded body, wherein a portion of the molded body is comprised of an elastically extensible material and a portion of the molded body is strain limiting relative to the elastically extensible material, and wherein the thickness of the molded body is at least 1 mm; and
   a pressurizing inlet that is configured to receive fluid for the plurality of interconnected chambers,
   wherein the molded body is configured to preferentially expand when the plurality of interconnected chambers are pressurized by the fluid, causing a bending motion around the strain limiting portion of the molded body; and wherein the strain limiting portion has a wall thickness greater than other portions of the flexible molded body.

2. The soft robotic device of claim 1, wherein the device is free of a rigid weight-bearing skeleton.

3. The soft robotic device of claim 1, wherein the strain limiting portion or member is formed using a material with higher elastic modulus compared to that of a material forming other portions of the flexible molded body.

4. The soft robotic device of claim 1, wherein the molded body comprises a reinforcing material to increase toughness and resistance to damage.

5. The soft robotic device of claim 1, wherein the flexible molded body and the plurality of interconnected chambers each have a longitudinal axis, and wherein the longitudinal axes of the plurality of interconnected chambers are positioned and arranged at an angle with respect to the longitudinal axis of the flexible molded body, wherein the angle is between zero and 90 degrees.

6. The soft robotic device of claim 1, wherein a thickness of the flexible molded body is in the range of about 5 mm and 5 cm.

7. The soft robotic device of claim 1, wherein the flexible molded body further includes a functional feature disposed on a surface of the flexible molded body.

8. The soft robotic device of claim 7, wherein the functional feature is one or more features selected from the group consisting of a traction layer, a bidirectional fabric layer, a camouflage layer, a self-healing layer, suction cups and magnets.

9. The soft robotic device of claim 8, wherein the self-healing layer comprises a self-sealing layer disposed on a portion of the flexible molded body, wherein the self-sealing layer includes a material of lower elastic modulus compared to that of a material forming the flexible molded body.

10. The soft robotic device of claim 8, wherein the camouflaging layer includes a plurality of fluid chambers and a plurality of fluid inlets, wherein each of the plurality of fluid chambers is in fluid communication with one of the plurality of fluid inlets.

11. A method of camouflaging a soft robotic device, the method comprising:
providing a soft robot according to claim 10; and
providing fluid of a first characteristic to a first of the plurality of fluid inlets.

12. The method of claim 11, wherein the fluid of the first characteristic includes a pigment.

13. The method of claim 11, wherein the fluid of the first characteristic includes a fluorescence material.

14. The method of claim 11, wherein the fluid of the first characteristic includes a phosphorescence material.

15. The method of claim 11, further comprising providing fluid of a second characteristic to a second of the plurality of fluid inlets, wherein the second characteristic is different from the first characteristic.

16. The soft robotic device of claim 1, further comprising a pressure source configured to be in fluid communication with the pressurizing inlet, wherein the pressure source is configured to provide the fluid.

17. The soft robotic device of claim 16, wherein the pressure source includes a microcompressor or a water electrolyzer.

18. A gripping device comprising a plurality of actuatable arms, wherein each of the plurality of actuatable arms includes a soft robotic device of claim 1, wherein the plurality of actuatable arms are configured to bend from a first resting position to a second actuated position upon pressurization.

19. The gripping device of claim 18, wherein the gripping device is configured to lift loads in a range of greater than 80 g and/or of a size that is greater than 1 cm.

20. A method of gripping comprising:
providing a gripping device according to claim 18; and
initiating a series pressurizations and depressurizations that bring the gripping device in gripping contact with a target object.

21. A method of actuation comprising:
providing a soft robotic device according to claim 1; and
providing sufficient pressure to the soft robotic device or the gripping device or the soft robot or the pressurizable network or the soft machine to cause a less stiff wall to expand preferentially, thereby causing the soft robotic device or the gripping device or the soft robot or the pressurizable network or the soft machine to bend around a strain limiting member of the soft robotic device or the gripping device or the soft robot or the pressurizable network or the soft machine.

22. A soft robotic device, comprising:
a flexible molded body comprising a plurality of interconnected pleated chambers, the flexible molded body being comprised of a flexible material and affixed to a strain limiting member in such a manner that the strain limiting member forms a wall of the plurality of interconnected pleated chamber, wherein a thickness of the molded body is at least 1 mm; and
a pressurizing inlet that is configured to receive fluid for the plurality of interconnected pleated chamber,
wherein the plurality of interconnected pleated chambers are configured to preferentially unfold when the flexible molded body is pressurized through the pressurizing inlet, causing bending motion around the strain limiting member; and wherein the strain limiting member has a wall thickness greater than other portions of the flexible molded body.

23. A soft robotic device capable of extension, comprising:
a flexible molded body having a plurality of interconnected chambers disposed within the molded body; and
a sealing member in a facing relationship with the flexible molded body, wherein the flexible molded body and the sealing member together define a plurality of channels, said channel defined by upper, lower and side walls, and wherein the sealing member is in a state of compression in its resting state and
a pressurizing inlet in fluid communication with the plurality of channels,
the plurality of channels positioned and arranged such that the soft body robotic device expands to relieve the strain in the sealing member when the soft body robotic device is pressurized through the inlet.

24. The soft robotic device of claim 23, wherein the sealing member comprises a strain limiting member and the molded body comprises a plurality of interconnected chambers in facing and sealing relationship with the strain limiting member, wherein the strain limiting member forms a wall of a chamber.

25. The soft robotic device of claim 24, wherein the soft robotic device further comprises a second plurality of interconnected chambers in facing and sealing relationship with the strain limiting member on a face opposite to the first plurality of interconnected chambers.

26. The soft robotic device of claim 23, wherein the sealing member further comprises a reinforcing fiber or fabric.

27. A soft robotic device comprising:
a flexible molded body having a plurality of interconnected chambers disposed within the molded body, wherein a portion of the molded body is comprised of an elastically extensible material and a portion of the molded body is strain limiting relative to the elastically extensible material, and wherein the thickness of the molded body is at least 1 mm; and a pressurizing inlet that is configured to receive fluid for the plurality of interconnected chambers, wherein the molded body is configured to preferentially expand when the plurality of interconnected chambers are pressurized by the fluid, causing a bending motion around the strain limiting portion of the molded body, wherein the molded body is comprised of a single material and the plurality of interconnected chambers comprise at least one wall that is thinner than the strain limiting portion or the strain limiting member.

28. A soft robotic device comprising:
a flexible molded body having a plurality of interconnected chambers disposed within the molded body, wherein a portion of the molded body is comprised of an elastically extensible material and a portion of the molded body is strain limiting relative to the elastically extensible material, and wherein the thickness of the molded body is at least 1 mm;
a pressurizing inlet that is configured to receive fluid for the plurality of interconnected chambers; and
a magnet;
wherein the molded body is configured to preferentially expand when the plurality of interconnected chambers are pressurized by the fluid, causing a bending motion around the strain limiting portion of the molded body.

29. A multi-component soft robot comprising:
a plurality of soft robotic devices according to claim 28; and
a connector having a plurality of fluidic inputs and a pressurizing inlet, wherein the pressurizing inlet is configured to receive fluid, and wherein each of the plurality of soft robotic devices is reversibly attached to one of the plurality of fluidic inputs by a magnetic attractive force.

30. A soft robot capable of locomotion comprising:
a plurality of arms, wherein each of the plurality of arms comprises:
  a flexible molded body having a plurality of interconnected chambers disposed within the molded body, wherein a portion of the molded body is comprised of an elastically extensible material and a portion of the molded body is strain limiting relative to the elastically extensible material, and wherein the thickness of the molded body is at least 1 mm; and
  a pressurizing inlet that is configured to receive fluid for the plurality of interconnected chambers, wherein the molded body is configured to preferentially expand when the plurality of interconnected chambers are pressurized by the fluid, causing a bending motion around the strain limiting portion of the molded body;

wherein each of the plurality of arms has a gripping surface over which at least a portion of the plurality of arms engages with a terrain; and
a plurality of pressurizing inlets configured to receive pressurized fluid.

31. A soft machine having multiple functionalities, comprising:
a soft robot capable of locomotion according to claim 30 having a first pressurizing inlet, wherein the soft robot is configured to provide locomotion to the soft machine;
a gripping device comprising a plurality of actuatable arms, wherein each of the plurality of actuatable arms includes a soft robotic device, wherein the plurality of actuatable arms are configured to bend from a first resting position to a second actuated position upon pressurization; and
a physical connector disposed between the soft robot capable of locomotion and the gripping device,
wherein the soft robotic device of the gripping device comprises:
  a flexible molded body having a plurality of interconnected chambers disposed within the molded body, wherein a portion of the molded body is comprised of an elastically extensible material and a portion of the molded body is strain limiting relative to the elastically extensible material, and wherein the thickness of the molded body is at least 1 mm; and
  a second pressurizing inlet that is configured to receive fluid for the plurality of interconnected chambers, wherein the molded body is configured to preferentially expand when the plurality of interconnected chambers are pressurized by the fluid, causing a bending motion around the strain limiting portion of the molded body.

32. The soft machine of claim 31, further comprising a pressure source having a first fluid outlet and a second fluid outlet, wherein the first fluid outlet is configured to be in fluid communication with the first pressurizing inlet, and wherein the second fluid outlet is configured to be in fluid communication with the second pressurizing inlet.

33. The soft machine of claim 31, wherein the physical connector includes a flexible tether.

34. A method of providing locomotion to a soft robot, the method comprising:
providing a soft robot according to claim 30;
providing pressurized fluid to a first pressurizing inlet of the soft robot; and
providing pressurized fluid to a second pressurizing inlet of the soft robot, thereby separately actuating a first arm associated with the first pressurizing inlet and a second arm associated with the second pressurizing inlet.

* * * * *